(12) United States Patent
Lai

(10) Patent No.: US 12,504,624 B2
(45) Date of Patent: Dec. 23, 2025

(54) OPTICAL LENS

(71) Applicant: Chien-Hsun Lai, Taichung (TW)

(72) Inventor: Chien-Hsun Lai, Taichung (TW)

( * ) Notice: Subject to any disclaimer, the term of this patent is extended or adjusted under 35 U.S.C. 154(b) by 421 days.

(21) Appl. No.: 18/109,270

(22) Filed: Feb. 14, 2023

(65) Prior Publication Data

US 2023/0375811 A1 Nov. 23, 2023

Related U.S. Application Data

(60) Provisional application No. 63/344,855, filed on May 23, 2022.

(51) Int. Cl.
*G02B 27/00* (2006.01)
*G02B 13/00* (2006.01)
*H04N 23/55* (2023.01)

(52) U.S. Cl.
CPC ....... *G02B 27/0018* (2013.01); *G02B 13/005* (2013.01); *G02B 13/0055* (2013.01); *H04N 23/55* (2023.01); *G02B 13/004* (2013.01); *G02B 13/0045* (2013.01)

(58) Field of Classification Search
None
See application file for complete search history.

(56) References Cited

U.S. PATENT DOCUMENTS

| | | | |
|---|---|---|---|
| 8,361,830 B2 * | 1/2013 | Yang | H04N 23/57 257/E23.116 |
| 8,967,814 B2 * | 3/2015 | Chang | G02B 7/02 359/740 |
| 9,016,876 B2 * | 4/2015 | Lai | G02B 13/0035 359/740 |
| 11,892,658 B2 * | 2/2024 | Ogane | G02B 1/10 |
| 2015/0022894 A1 * | 1/2015 | Yamamoto | C09D 163/00 359/580 |
| 2018/0246256 A1 * | 8/2018 | Abe | B29D 11/00884 |
| 2020/0241239 A1 * | 7/2020 | Lin | G02B 1/041 |
| 2020/0409021 A1 * | 12/2020 | Wang | H04N 23/55 |
| 2021/0333518 A1 * | 10/2021 | Chang | G02B 13/0045 |
| 2021/0396915 A1 * | 12/2021 | Chen | G02B 27/0018 |

* cited by examiner

*Primary Examiner* — Darryl J Collins
(74) *Attorney, Agent, or Firm* — Apex Juris, pllc; Hilde M. L. Coeckx

(57) ABSTRACT

An optical lens for being passed through by an image light includes a first lens, a second lens, and a first shading layer. The first lens has a first optical valid area and a first optical invalid area surrounding the first optical valid area. The second lens has a second optical valid area and a second optical invalid area. The second optical valid area faces the first optical valid area. The second optical invalid area surrounds the second optical valid area. The first shading layer is disposed on a side peripheral surface of the first optical invalid area and a side peripheral surface of the second optical invalid area, providing the function of blocking the non-imaging light, reducing the number of light-shielding parts, reducing the cost of parts, and shortening the assembling time.

32 Claims, 17 Drawing Sheets

OPTICAL LENS

BACKGROUND OF THE INVENTION

Technical Field

The present invention generally relates to an optical lens module, and more particularly to an optical lens with a shading function, which could be applied to electronic products.

Description of Related Art

In recent years, with advancements in portable electronic devices having camera functionalities, the demand for an optical image capturing system raises gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality rapidly raises.

Conventional lens assembling structures use the lens barrel to fix the relative position of the lenses, and the lens barrel is also used as a part that blocks non-imaging light. However, with advancements in increasing pixels and miniaturization of portable electronic products, the conventional optical system that has to be used with lens barrel equipment for providing a light-shielding effect cannot meet the requirements of reducing the volume of the assembled lens.

BRIEF SUMMARY OF THE INVENTION

In view of the reasons mentioned above, the primary objective of the present invention is to provide an optical lens having at least one lens with light-shielding characteristics, which could effectively block non-imaging light from entering the lens, improving the imaging quality, reducing the number of light-shielding parts, reducing the cost of parts, and shortening the assembling time.

The present invention provides an optical lens for being passed through by an image light, including a first lens, a second lens, and a first shading layer. The first lens has a first optical valid area and a first optical invalid area, wherein the first optical invalid area surrounds the first optical valid area and has a first peripheral portion and a first connecting portion. A side of the first connecting portion is connected to the first optical valid area, and another side of the first connecting portion is connected to the first peripheral portion. The second lens has a second optical valid area and a second optical invalid area, wherein the second optical invalid area surrounds the second optical valid area and has a second peripheral portion and a second connecting portion. A side of the second connecting portion is connected to the second optical valid area, and another side of the second connecting portion is connected to the second peripheral portion. The second peripheral portion is disposed on the first peripheral portion, and the second optical valid area faces the first optical valid area, allowing the image light to pass through the first optical valid area and the second optical valid area. The first shading layer is made of an opaque material and attached to a side peripheral surface of the first peripheral portion and/or a side peripheral surface of the second peripheral portion, allowing the first shading layer to correspondingly surround the first optical invalid area and/or the second optical invalid area.

The present invention further provides an optical lens for being passed through by an image light, including a first lens and a second lens. The first lens has a first optical valid area and a first optical invalid area, wherein the first optical invalid area surrounds the first optical valid area and has a first peripheral portion and a first connecting portion. A side of the first connecting portion is connected to the first optical valid area, and another side of the first connecting portion is connected to the first peripheral portion. At least a part of the first peripheral portion is made of an opaque material. The second lens has a second optical valid area and a second optical invalid area, wherein the second optical invalid area surrounds the second optical valid area and has a second peripheral portion and a second connecting portion. A side of the second connecting portion is connected to the second optical valid area, and another side of the second connecting portion is connected to the second peripheral portion. At least a part of the second peripheral portion is made of an opaque material. The second peripheral portion is disposed on the first peripheral portion, and the second optical valid area faces the first optical valid area, allowing the image light to pass through the first optical valid area and the second optical valid area.

The present invention further provides an optical lens for being passed through by an image light, including at least one lens having an optical valid area and an optical invalid area, wherein the optical invalid area surrounds the optical valid area and has a peripheral portion and a connecting portion. A side of the connecting portion is connected to the optical valid area, and another side of the connecting portion is connected to the peripheral portion. At least a part of the peripheral portion is made of an opaque material, alternatively, a first shading layer made of an opaque material is attached to a side peripheral surface of the peripheral portion.

With the aforementioned design, the first shading layer of the optical lens could have the function of blocking light. Additionally, the first shading layer could effectively block the non-imaging light from entering the lens due to the first shading layer is disposed on the side peripheral surface of the first lens and/or the second lens, thereby not only reducing the interference of the non-imaging light to the optical lens to improve the imaging effect of the optical lens but also saving the light-shielding materials and the cost of parts and reducing shortening the assembling time, achieving the miniaturization of the optical lens and improving the optical imaging quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

An optical lens 100 according to a first embodiment of the present invention is illustrated in FIG. 1 to FIG. 4, which is adapted to be passed through by an image light and includes a first lens 110, a second lens 120, and a first shading layer 10, wherein an optical axis Z of the image light sequentially passes through the first lens 110 and the second lens 120.

Figure 1:
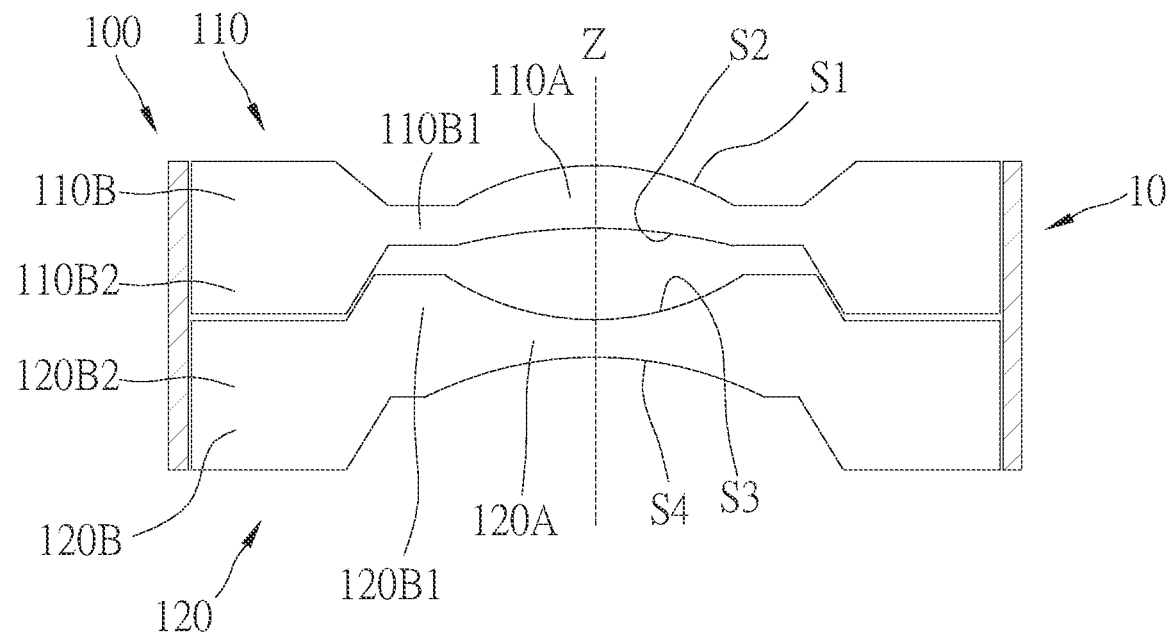
FIG. 1 is a schematic view of the optical lens according to a first embodiment of the present invention.

The first lens 110 has a first optical valid area 110A and a first optical invalid area 110B. Referring to FIG. 1, the first optical valid area 110A has a first upper optical surface S1 and a first lower optical surface S2 that face opposite directions, wherein the first optical valid area 110A is a convex-concave type (i.e., the first upper optical surface S1 is a convex surface and the first lower optical surface S2 is a concave surface), and the first upper optical surface S1 and the first lower optical surface S2 are adapted to be passed through by the optical axis Z of the image light.

The first optical invalid area 110B surrounds a periphery of the first optical valid area 110A. Referring to FIG. 1, the first optical invalid area 110B has a first connecting portion 110B1 and a first peripheral portion 110B2, wherein a side of the first connecting portion 110B1 is connected to the first optical valid area 110A, and another side thereof is connected to the first peripheral portion 110B2, so that the first peripheral portion 110B2 is located on an outer periphery of the first lens 110 relative to the first optical valid area 110A, and the first connecting portion 110B1 is connected between the first peripheral portion 110B2 and the first optical valid area 110A.

More specifically, the first connecting portion 110B1 of the first lens 110 has a first upper connecting surface 111 and a first lower connecting surface 112 that face opposite directions, wherein the first upper connecting surface 111 is connected to a periphery of the first upper optical surface S1, and the first lower connecting surface 112 is connected to a periphery of the first lower optical surface S2; the first peripheral portion 110B2 of the first lens 110 has a first upper peripheral surface 113 and a first lower peripheral surface 114 that face opposite directions. In the current embodiment, the first peripheral portion 110B2 extends from both the first upper peripheral surface 113 and the first lower peripheral surface 114 toward the first connecting portion 110B1, and a width of the first peripheral portion 110B2 decreases gradually from both the first upper peripheral surface 113 and the first lower peripheral surface 114 toward the first connecting portion 110B1; the first peripheral portion 110B2 has a first abutting inclined surface 115 and a third abutting inclined surface 116, wherein the first abutting inclined surface 115 is connected between the first lower peripheral surface 114 and the first lower connecting surface 112 in an inclined way, and the third abutting inclined surface 116 is connected between the first upper peripheral surface 113 and the first upper connecting surface 111 in an inclined way. Referring to FIG. 1, the first lower optical surface S2, the first lower connecting surface 112, and the first lower peripheral surface 114 of the first lens 110 respectively face the second lens 120.

The second lens 120 has a second optical valid area 120A and a second optical invalid area 120B, wherein the second optical valid area 120A has a second upper optical surface S3 and a second lower optical surface S4 that face opposite directions. The second optical valid area 120A is a biconcave type (i.e., the second upper optical surface S3 is a concave surface and the second lower optical surface S4 is a concave surface). The second upper optical surface S3 and the second lower optical surface S4 are adapted to be passed through by the optical axis Z of the image light.

The second optical invalid area 120B surrounds a periphery of the second optical valid area 120A and has a second connecting portion 120B1 and a second peripheral portion 120B2, wherein a side of the second connecting portion 120B1 is connected to the second optical valid area 120A, and another side of the second connecting portion 120B1 is connected to the second peripheral portion 120B2, so that the second peripheral portion 120B2 is located on an outer periphery of the second lens 120 relative to the second optical valid area 120A, and the second connecting portion 120B1 is connected between the second peripheral portion 120B2 and the second optical valid area 120A.

More specifically, the second connecting portion 120B1 of the second lens 120 has a second upper connecting surface 121 and a second lower connecting surface 122 that face opposite directions, wherein the second upper connecting surface 121 is connected to a periphery of the second upper optical surface S3, and the second lower connecting surface 122 is connected to a periphery of the second lower optical surface S4; the second peripheral portion 120B2 of the second lens 120 has a second upper peripheral surface 123 and a second lower peripheral surface 124 that face opposite directions. In the current embodiment, the second peripheral portion 120B2 extends from both the second upper peripheral surface 123 and the second lower peripheral surface 124 toward the first lens 110 to be connected to the second connecting portion 120B1; the second peripheral portion 120B2 has a second abutting inclined surface 125 and a fourth abutting inclined surface 126, wherein the second abutting inclined surface 125 is connected between the second upper peripheral surface 123 and the second upper connecting surface 121 in an inclined way, and the fourth abutting inclined surface 126 is connected between the second lower peripheral surface 124 and the second lower connecting surface 122 in an inclined way.

The first peripheral portion 110B2 of the first lens 110 is disposed on the second peripheral portion 120B2 of the second lens 120. More specifically, the first abutting inclined surface 115 of the first peripheral portion 110B2 is abutted against the second abutting inclined surface 125 of the second peripheral portion 120B2, at that time, a peripheral gap G1 is formed between the first lower peripheral surface 114 of the first peripheral portion 110B2 and the first upper peripheral surface 113 of the second peripheral portion 120B2, and a connection gap P1 is formed between the first lower connecting surface 112 of the first connecting portion 110B1 and the second upper connecting surface 121 of the second connecting portion 120B1, and the second optical valid area 120A of the second lens 120 faces the first optical valid area 110A of the first lens 110, allowing the optical axis Z of the image light sequentially passes through the first optical valid area 110A and the second optical valid area 120A.

The first shading layer 10 is made of an opaque material and is disposed on a peripheral edge of the first lens 110 and a peripheral edge of the second lens 120. In the current embodiment, the first shading layer 10 is attached to both a side peripheral surface of the first peripheral portion 110B2 of the first lens 110 and a side peripheral surface of the second peripheral portion 120B2 of the second lens 120 (i.e., the first shading layer 10 surrounds an outer peripheral surface of the first optical invalid area 110B and an outer peripheral surface of the second optical invalid area 120B, wherein the opaque material of the first shading layer 10 includes a group selected from ceramics, metals, metal oxides, polyurethanes, epoxies, alkyds, polyester paints, and opaque adhesives; the metals includes pure metals such as aluminum (Al), copper (Cu), molybdenum (Mo), etc., and alloys, such as nickel chromium (NiCr), nickel aluminum (NiAl), aluminum bronze (CuAl), etc.; the metal oxides includes Aluminum oxide ($Al_2O_3$), chromium oxide ($Cr_2O_3$), zirconia ($ZrO_2$), titanium oxide ($TiO_2$), etc.

In other embodiments, the first shading layer 10 could be disposed on either the side peripheral surface of the first peripheral portion 110B2 of the first lens 110 or the side peripheral surface of the second peripheral portion 120B2 of the second lens 120, or on both the side peripheral surface of the first peripheral portion 110B2 of the first lens 110 and the side peripheral surface of the second peripheral portion 120B2 of the second lens 120 to meet various requirements, wherein the first shading layer 10 correspondingly surrounds a periphery of the first optical invalid area 110B or/and a periphery of the second optical invalid area 120B, which could also achieve the effect of blocking non-imaging light from entering the optical valid areas.

Additionally, the first shading layer 10 could be ink, paint, or sheet, wherein if the first shading layer 10 is ink, the first shading layer 10 is formed on the side peripheral surface of the first peripheral portion 110B2 of the first lens 110 and the side peripheral surface of the second peripheral portion 120B2 of the second lens 120 by screen printing; if the first shading layer 10 is a paint, the first shading layer 10 is formed on the first peripheral portion 110B2 of the first lens 110 and the second peripheral portion 120B2 of the second lens 120 by coating; if the first shading layer 10 is a sheet, the first shading layer 10 is formed by attaching the sheet to the first peripheral portion 110B2 of the first lens 110 and the second peripheral portion 120B2 of the second lens 120. However, the way of setting the first shading layer 10 is not limited by the aforementioned design, as long as the first shading layer 10 could be disposed on the first peripheral portion 110B2 of the first lens 110 and the second peripheral portion 120B2 of the second lens 120.

In summary, since the first shading layer 10 of the optical lens 100 has the function of blocking light and is disposed on the side peripheral surface of the first peripheral portion 110B2 of the first lens 110 and the side peripheral surface of the second peripheral portion 120B2 of the second lens 120, the first shading layer 10 could effectively block the non-imaging light while practical use, so that the non-imaging light could not pass through the first optical invalid area 110B and the second optical invalid area 120B through the side peripheral surface of the first lens 110 or the side peripheral surface of the second lens 120, thereby enhancing the imaging quality, reducing the number of light-shielding parts, reducing the cost of parts, and shortening the assembling time, achieving the miniaturization of the optical lens 100 and improving the optical imaging quality.

Figure 2:
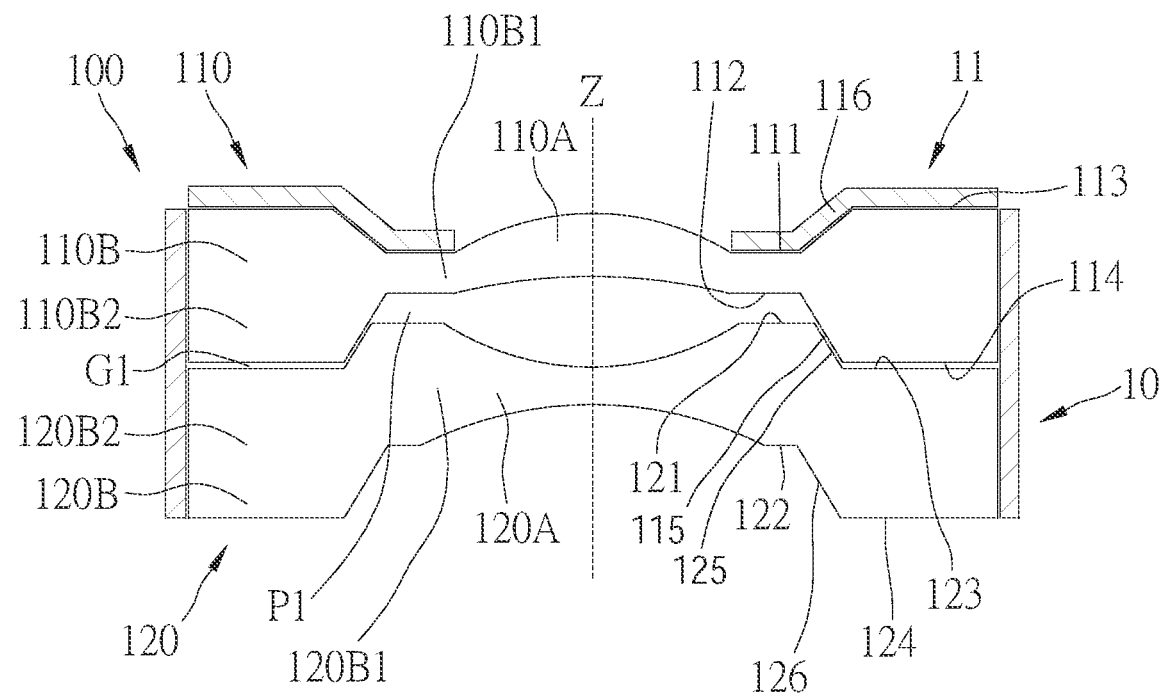
FIG. 2 is a schematic view of the optical lens according to the first embodiment of the present invention.

Referring to FIG. 2, the optical lens 100 according to the first embodiment further includes a second shading layer 11 for increasing an shading area of the optical lens 100.

The second shading layer 11 is made of an opaque material and is disposed on the first optical invalid area 110B of the first lens 110. In the current embodiment, the second shading layer 11 is attached to the first upper connecting surface 111 of the first connecting portion 110B1, the first upper peripheral surface 113 of the first peripheral portion 110B2, and the third abutting inclined surface 116 (i.e., the second shading layer 11 surrounds a periphery of the first upper optical surface S1 of the first optical valid area 110A), and the first shading layer 10 and the second shading layer 11 are made of different materials, wherein the opaque material of the second shading layer 11 is selected from ceramics, metals, metal oxides, polyurethanes, epoxies, alkyds, polyester paints, opaque adhesives, and a combination thereof; the metals includes pure metals such as aluminum (Al), copper (Cu), molybdenum (Mo), etc., and alloys, such as nickel chromium (NiCr), nickel aluminum (NiAl), aluminum bronze (CuAl), etc.; the metal oxides includes Aluminum oxide ($Al_2O_3$), chromium oxide ($Cr_2O_3$), zirconia ($ZrO_2$), titanium oxide ($TiO_2$), etc. In other embodiments, the first shading layer 10 and the second shading layer 11 could be made of the same material to meet various requirements.

More specifically, the second shading layer 11 could be ink, paint, or sheet, wherein the way of setting the second shading layer 11 is the same as that of the first shading layer 10 (e.g. by screen printing, coating, and attaching). For instance, if the second shading layer 11 is ink, the second shading layer 11 is formed on the first optical invalid area 110B by screen printing; if the second shading layer 11 is a paint, the second shading layer 11 is formed on the first optical invalid area 110B by coating; if the second shading layer 11 is a sheet, the second shading layer 11 is formed by attaching the sheet to the first optical invalid area 110B. However, the way of setting the second shading layer 11 is not limited by the aforementioned design.

In other embodiments, the first shading layer 10 and the second shading layer 11 could be made of the same material to meet various requirements; the second shading layer 11 could be disposed on the first upper connecting surface 111 of the first connecting portion 110B1, the first upper peripheral surface 113 of the first peripheral portion 110B2, or both the first upper connecting surface 111 of the first connecting portion 110B1 and the first upper peripheral surface 113 of the first peripheral portion 110B2; alternatively, the second shading layer 11 could be omitted.

With the second shading layer 11, the optical lens 100 could further block the non-imaging light from entering the first optical invalid area 110B through the first connecting portion 110B1 and first peripheral portion 110B2 of the first lens 110, and could concentrate the image light into the first optical valid area 110A, which further improves the imaging quality of the optical lens 100 and further saves the cost of shading parts.

Figure 3:
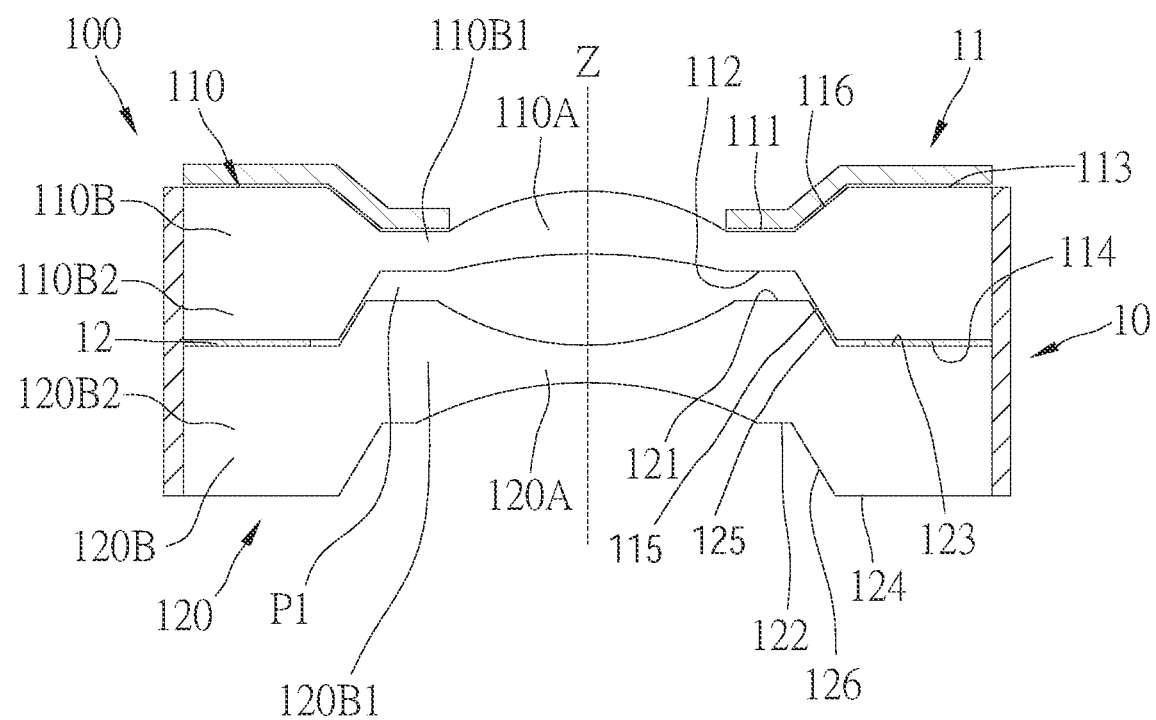
FIG. 3 is a schematic view of the optical lens according to the first embodiment of the present invention.

Referring to FIG. 3, the optical lens 100 according to the first embodiment further includes a third shading layer 12 for enhancing the shading effect.

The third shading layer 12 is made of an opaque material and is disposed between the first lens 110 and the second lens 120. In the current embodiment, the third shading layer 12 is located in the peripheral gap G1 formed between the first peripheral portion 110B2 and the second peripheral portion 120B2, and gets in contact with the first lower peripheral surface 114 and the second upper peripheral surface 123, wherein the first shading layer 10 and the third shading layer 12 are made of different materials. The opaque material of the third shading layer 12 is selected from ceramics, metals, metal oxides, polyurethanes, epoxies, alkyds, polyester paints, opaque adhesives, and a combination thereof; the metals include pure metals such as aluminum (Al), copper (Cu), molybdenum (Mo), etc., and alloys, such as nickel chromium (NiCr), nickel aluminum (NiAl), aluminum bronze (CuAl), etc.; the metal oxides includes Aluminum oxide ($Al_2O_3$), chromium oxide ($Cr_2O_3$), zirconia ($ZrO_2$), titanium oxide ($TiO_2$), etc.

Additionally, the third shading layer 12 could be ink, paint, or sheet, wherein the way of setting the third shading layer 12 in the peripheral gap G1 is the same as that of the first shading layer 10. However, the way of setting the third shading layer 12 is not limited by the aforementioned design, as long as the third shading layer 12 could be formed in the peripheral gap G1. In other embodiments, the first shading layer 10, the second shading layer 11, and the third shading layer 12 could be made of the same material and be set in the same way to meet various requirements; alternatively, the third shading layer 12 could be omitted.

With the third shading layer 12, the optical lens 100 could further block the non-imaging light from entering the second peripheral portion 120B2 of the second lens 120 through the first peripheral portion 110B2 of the first lens 110, thereby reducing the interference of the non-imaging light to the second lens 120, improving the imaging effect of the optical lens 100.

Figure 4:
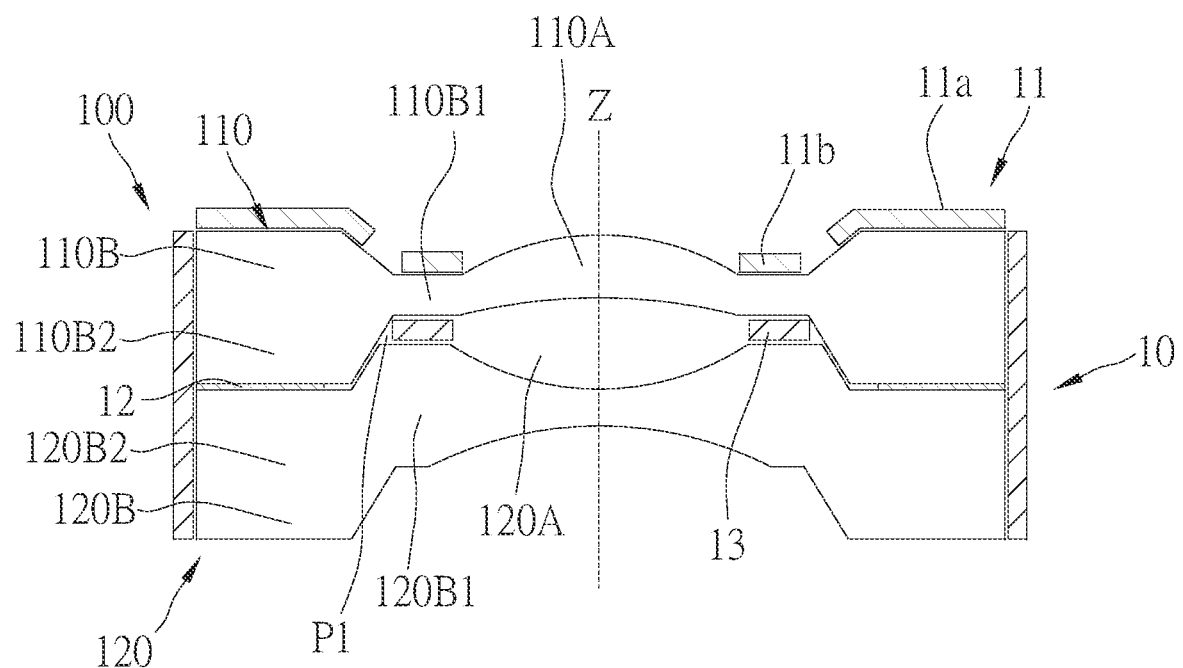
FIG. 4 is a schematic view of the optical lens according to the first embodiment of the present invention.

Referring to FIG. 4, the optical lens 100 according to the first embodiment further includes a fourth shading layer 13 for enhancing the shading effect.

The fourth shading layer 13 is made of an opaque material and is disposed between the first lens 110 and the second lens 120. In the current embodiment, the fourth shading layer 13 is located in the connection gap P1 formed between the first lower connecting surface 112 of the first connecting portion 110B1 and the second upper connecting surface 121 of the second connecting portion 120B1, and is attached to the first lower connecting surface 112 and the second upper connecting surface 121, wherein the first shading layer 10 and the fourth shading layer 13 are made of different materials. The opaque material of the fourth shading layer 13 is selected from ceramics, metals, metal oxides, polyurethanes, epoxies, alkyds, polyester paints, opaque adhesives, and a combination thereof; the metals include pure metals such as aluminum (Al), copper (Cu), molybdenum (Mo), etc., and alloys, such as nickel chromium (NiCr), nickel aluminum (NiAl), aluminum bronze (CuAl), etc.; the metal oxides includes Aluminum oxide ($Al_2O_3$), chromium oxide ($Cr_2O_3$), zirconia ($ZrO_2$), titanium oxide ($TiO_2$), etc.

Additionally, the fourth shading layer 13 could be ink, paint, or sheet, wherein the way of setting the fourth shading layer 13 in the connection gap P1 is the same as that of the first shading layer 10. However, the way of setting the fourth shading layer 13 is not limited by the aforementioned design, as long as the fourth shading layer 13 could be formed in the connection gap P1. In other embodiments, the first shading layer 10, the second shading layer 11, the third shading layer 12, and the fourth shading layer 13 could be made of the same material and be set in the same way to meet various requirements; alternatively, the fourth shading layer 13 could be omitted.

In the current embodiment, the second shading layer 11 of the optical lens 100 is separated into a peripheral section 11a and a connecting section 11b, wherein the peripheral section 11a is disposed on the first upper peripheral surface 113 of the first peripheral portion 110B2 and a part of the third abutting inclined surface 116, and the connecting section 11b is disposed on the first upper connecting surface 111 of the first connecting portion 110B1; the peripheral section 11a does not get in contact with the connecting section 11b, not affecting the imaging quality of the optical lens 100. In other embodiments, the peripheral section 11a could get in contact with the connecting section 11b, avoiding the leakage of ineffective light.

With the fourth shading layer 13, the optical lens 100 could strengthen the blocking of the non-imaging light from the first connecting portion 110B1 of the first lens 110 into the second connecting portion 120B1 of the second lens 120, further reducing the interference of the non-imaging light to the second lens 120, improving the imaging effect of the optical lens 100. Without compromising the imaging quality of the optical lens 100, the second shading layer 11 could be designed in segments.

Figure 5:
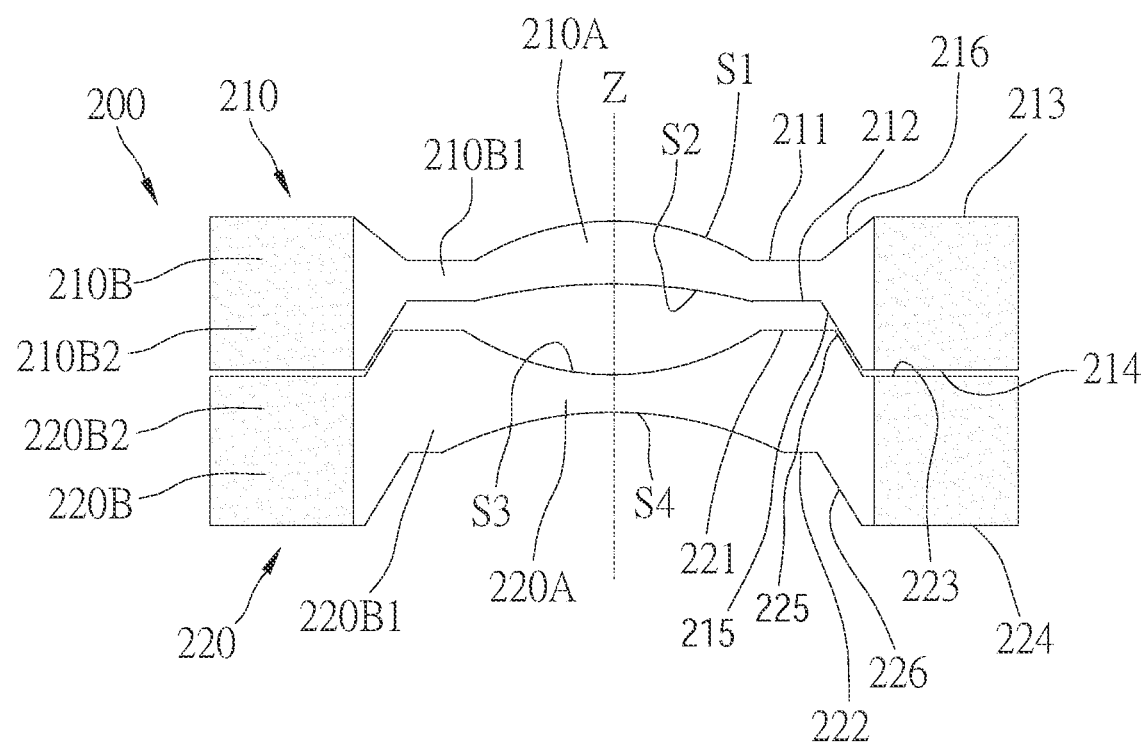
FIG. 5 is a schematic view of the optical lens according to a second embodiment of the present invention.
Figure 6:
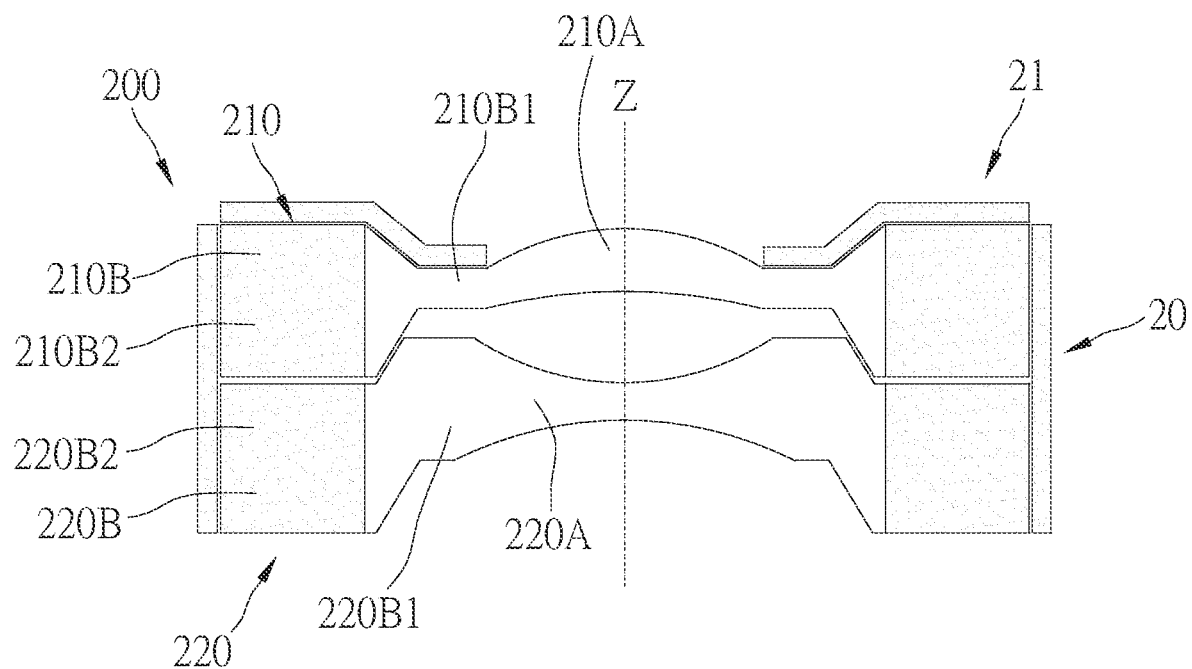
FIG. 6 is a schematic view of the optical lens according to the second embodiment of the present invention.

An optical lens 200 according to a second embodiment of the present invention is illustrated in FIG. 5 and FIG. 6 and includes a first lens 210 and a second lens 220.

The first lens 210 has a first optical valid area 210A and a first optical invalid area 210B. Referring to FIG. 5, the first optical valid area 210A has a first upper optical surface S1 and a first lower optical surface S2 that face opposite directions, wherein the first optical valid area 210A is a convex-concave type (i.e., the first upper optical surface S1 is a convex surface and the first lower optical surface S2 is a concave surface), and the first upper optical surface S1 and the first lower optical surface S2 are adapted to be passed through by the optical axis Z of the image light.

The first optical invalid area 210B surrounds a periphery of the first optical valid area 210A. Referring to FIG. 5, the first optical invalid area 210B has a first connecting portion 210B1 and a first peripheral portion 210B2, wherein a side of the first connecting portion 210B1 is connected to the first optical valid area 210A, and another side of the first connecting portion 210B1 is connected to the first peripheral portion 210B2, so that the first peripheral portion 210B2 is located on an outer periphery of the first lens 210 relative to the first optical valid area 210A, and the first connecting portion 210B1 is connected between the first peripheral portion 210B2 and the first optical valid area 210A.

In the current embodiment, at least a part of the first peripheral portion 210B2 is made of an opaque material, wherein the opaque material could be opaque plastic materials, or could be formed by modifying light-transmitting materials through laser modification. In the current embodiment, a part of the first peripheral portion 210B2 is made of opaque plastic materials, wherein the first peripheral portion 210B2 has a first upper peripheral surface 213 and a first lower peripheral surface 214 that face opposite directions; the part of the first peripheral portion 210B2 that is opaque is an area between the first upper peripheral surface 213 and the first lower peripheral surface 214.

Additionally, the first connecting portion 210B1 of the first lens 210 has a first upper connecting surface 211 and a first lower connecting surface 212 that face opposite directions, wherein the first upper connecting surface 211 is connected to a periphery of the first upper optical surface S1, and the first lower connecting surface 212 is connected to a periphery of the first lower optical surface S2; the first peripheral portion 210B2 extends from both the first upper peripheral surface 213 and the first lower peripheral surface 214 toward the first connecting portion 210B1, and a width of the first peripheral portion 210B2 decreases gradually from both the first upper peripheral surface 213 and the first lower peripheral surface 214 toward the first connecting portion 210B1; the first peripheral portion 210B2 has a first abutting inclined surface 215 and a third abutting inclined surface 216, wherein the first abutting inclined surface 215 is connected between the first lower peripheral surface 214 and the first lower connecting surface 212 in an inclined way, and the third abutting inclined surface 216 is connected between the first upper peripheral surface 213 and the first upper connecting surface 211 in an inclined way.

The second lens 220 has a second optical valid area 220A and a second optical invalid area 220B, wherein the second optical valid area 220A has a second upper optical surface S3 and a second lower optical surface S4 that face opposite directions. The second optical valid area 220A is a biconcave type (i.e., the second upper optical surface S3 is a concave surface and the second lower optical surface S4 is a concave surface). The second upper optical surface S3 and the second lower optical surface S4 are adapted to be passed through by the optical axis Z of the image light.

The second optical invalid area 220B surrounds a periphery of the second optical valid area 220A and has a second connecting portion 220B1 and a second peripheral portion 220B2, wherein a side of the second connecting portion 220B1 is connected to the second optical valid area 220A, and another side of the second connecting portion 220B1 is connected to the second peripheral portion 220B2, so that the second peripheral portion 220B2 is located on an outer periphery of the second lens 220 relative to the second optical valid area 220A, and the second connecting portion 220B1 is connected between the second peripheral portion 220B2 and the second optical valid area 220A.

In the current embodiment, at least a part of the second peripheral portion 220B2 is made of an opaque material, wherein the opaque material could be opaque plastic materials, or could be formed by modifying light-transmitting materials through laser modification. In the current embodiment, a part of the second peripheral portion 220B2 is made of opaque plastic materials, wherein the second peripheral portion 220B2 has a second upper peripheral surface 223 and a second lower peripheral surface 224 that face opposite directions; the part of the second peripheral portion 220B2 that is opaque is an area between the second upper peripheral surface 223 and the second lower peripheral surface 224.

Additionally, the second connecting portion 220B1 of the second lens 220 has a second upper connecting surface 221 and a second lower connecting surface 222 that face opposite directions, wherein the second upper connecting surface 211 is connected to a periphery of the second upper optical surface S3, and the second lower connecting surface 222 is connected to a periphery of the second lower optical surface S4; the second peripheral portion 220B2 tilts upward from both the second upper peripheral surface 223 and the second lower peripheral surface 224 toward the first lens 210 to be connected to the second connecting portion 220B1; the second peripheral portion 220B2 has a second abutting inclined surface 225 and a fourth abutting inclined surface 226, wherein the second abutting inclined surface 225 is connected between the second upper peripheral surface 223 and the second upper connecting surface 221 in an inclined way, and the fourth abutting inclined surface 226 is connected between the second lower peripheral surface 224 and the second lower connecting surface 222 in an inclined way.

In this way, since some areas of the first peripheral portion 210B2 of the first lens 210 and some areas of the second peripheral portion 220B2 of the second lens 220 are opaque, both the first optical invalid area 210B of the first lens 210 and the second optical invalid area 220B of the second lens 220 could block light, effectively blocking non-imaging light from the side peripheral surface of the first peripheral portion 210B2 and the side peripheral surface of the second peripheral portion 220B2 into the first lens 210 and the second lens 220 as well, improving the imaging effect. Additionally, the optical lens 200 of the second embodiment could save more light-shielding materials than that of the first embodiment, which could reduce the lens processing cost of the optical lens 200.

Referring to FIG. 6, the optical lens 200 of the current embodiment further includes a first shading layer 20 and a second shading layer 21.

The first shading layer 20 is made of an opaque material, wherein the first shading layer 20 is disposed on the side peripheral surface of the first peripheral portion 210B2, the side peripheral surface of the second peripheral portion 220B2, or both the side peripheral surface of the first peripheral portion 210B2 and the side peripheral surface of the second peripheral portion 220B2, and correspondingly surrounds the first optical invalid area 210B or/and the second optical invalid area 220B. In the current embodiment, the first shading layer 20 surrounds the first peripheral portion 210B2 and the second peripheral portion 220B2 and forms an opaque surface on the both the side peripheral surface of the first peripheral portion 210B2 and the side peripheral surface of the second peripheral portion 220B2 through laser modification.

The second shading layer 21 is made of an opaque material and is disposed on the first upper connecting surface 211 of the first connecting portion 210B1, the first upper peripheral surface 213 of the first peripheral portion 210B2, and the third abutting inclined surface 216. In the current embodiment, the second shading layer 21 forms an opaque surface on the side peripheral surface of the first peripheral portion 210B2 and the side peripheral surface of the first connecting portion 210B1 through laser modification.

In other embodiments, the second shading layer 21 could be disposed on the first upper connecting surface 211 of the first connecting portion 210B1, the first upper peripheral surface 213 of the first peripheral portion 210B2, or on both the first upper connecting surface 211 of the first connecting portion 210B1 and the first upper peripheral surface 213 of the first peripheral portion 210B2.

With the first shading layer 20 and the second shading layer 21, the optical lens 200 could strengthen the blocking of the non-imaging light from the peripheral surface of the first lens 210 and the peripheral surface of the second lens 220 into the first peripheral portion 210B2 of the first lens 210 and the second peripheral portion 220B2 of the second lens 220, and could strengthen the blocking of the non-imaging light from a side of the first peripheral portion 210B2 and a side of the first connecting portion 210B1 of the first lens 210 into the first optical invalid area 210B, further improving the imaging effect of the optical lens 200.

Figure 7:
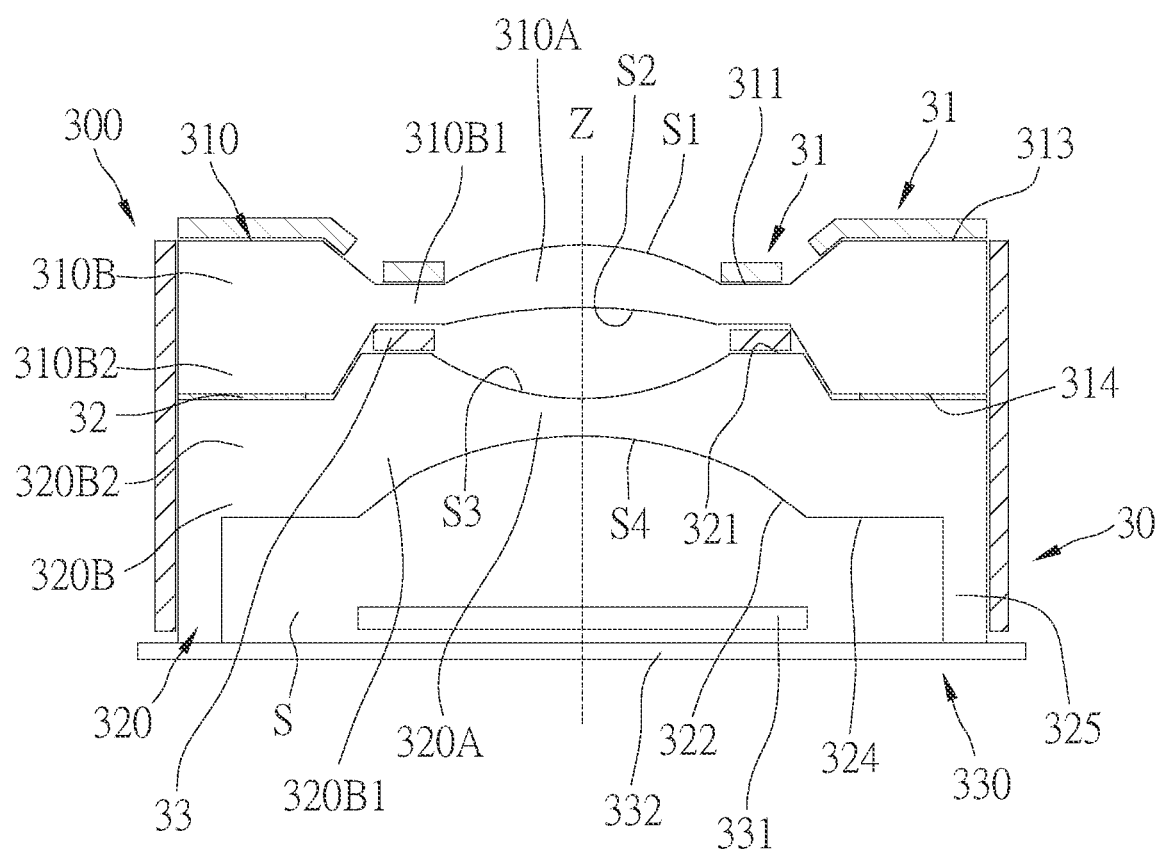
FIG. 7 is a schematic view of the optical lens according to a third embodiment of the present invention.
Figure 8:
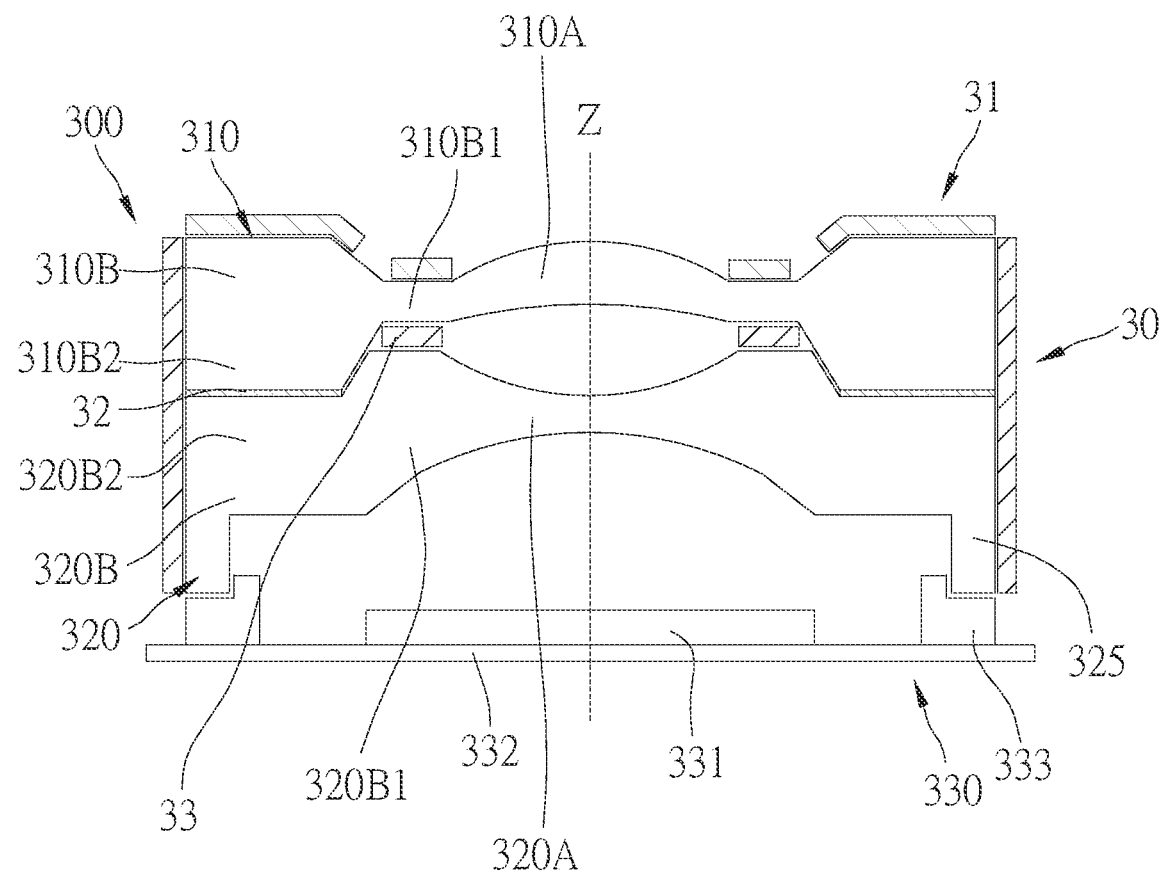
FIG. 8 is a schematic view of the optical lens according to the third embodiment of the present invention.
Figure 9:
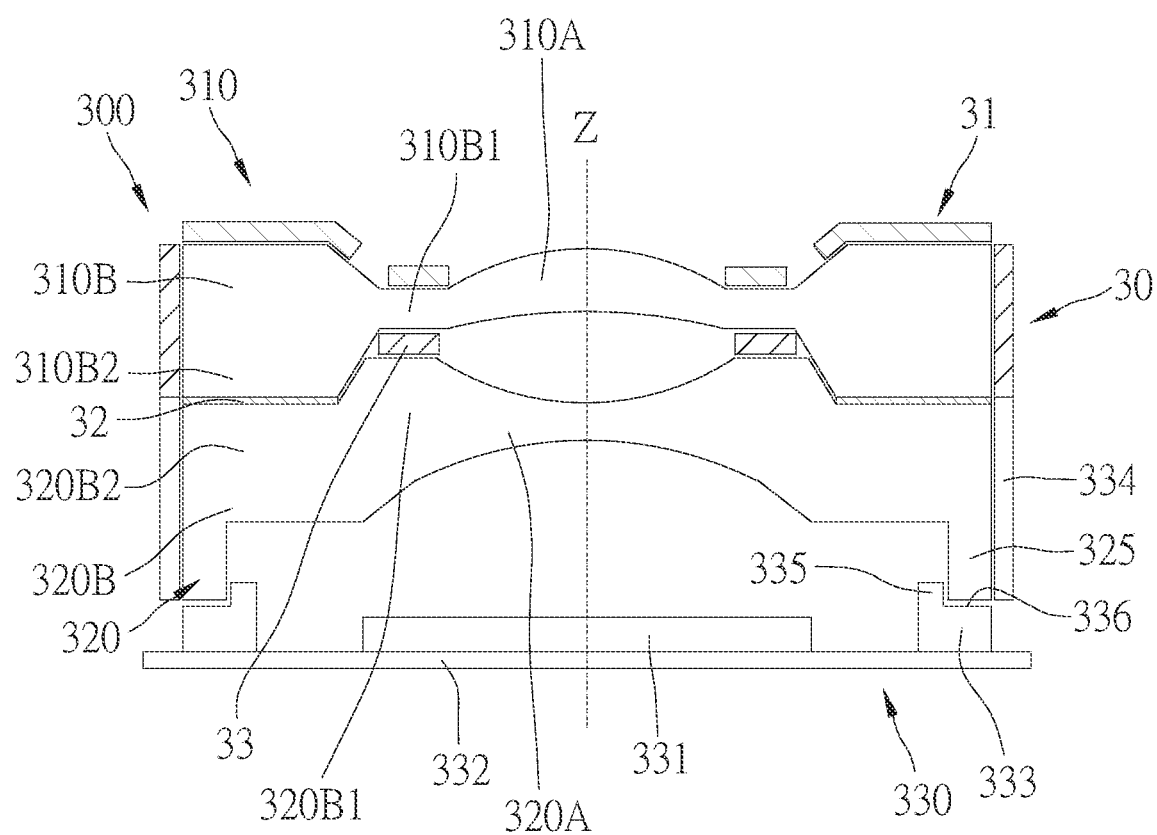
FIG. 9 is a schematic view of the optical lens according to the third embodiment of the present invention.

An optical lens 300 according to a third embodiment of the present invention is illustrated in FIG. 7 to FIG. 9 and includes a first lens 310, a second lens 320, a first shading layer 30, a second shading layer 31, a third shading layer 32, a fourth shading layer 33, and an image light sensing module 330, wherein the first lens 310 and the second lens 320 of the current embodiment has almost the same structure as that of the first embodiment. In other words, the first lens 310 of the current embodiment has a first optical valid area 310A and a first optical invalid area 310B, wherein the first optical valid area 310A has a first upper optical surface S1 and a first lower optical surface S2, and the first optical invalid area 310B has a first connecting portion 310B1 and a first peripheral portion 310B2. Similarly, the second lens 320 has a second optical valid area 320A and a second optical invalid area 320B, wherein the second optical valid area 320A has a second upper optical surface S3 and a second lower optical surface S4, and the second optical invalid area 320B has a second connecting portion 320B1 and a second peripheral portion 320B2. Referring to FIG. 7 and FIG. 8, the first shading layer 30, the second shading layer 31, the third shading layer 32, and the fourth shading layer 33 of the current embodiment are disposed and arranged similarly to the first shading layer 10, the second shading layer 11, the third shading layer 12, and the fourth shading layer 13 of the first embodiment shown in FIG. 4, thus we are not going to describe in details herein.

The difference between the optical lens 300 of the current embodiment and that of the first embodiment is that the optical lens 300 further includes the image light sensing module 330, and the structure of the second peripheral portion 320B2 of the second lens 320 of the current embodiment is slightly different from the second lens 120 of the first embodiment.

More specifically, the image light sensing module 330 includes an image sensing member 331 and a substrate 332, wherein the image sensing member 331 is adapted to receive the image light; the second optical valid area 320A of the second lens 320 faces the image sensing member 331; the substrate 332 is adapted to dispose the second peripheral portion 320B2 of the second lens 320, wherein the second peripheral portion 320B2 has an extending section 325. Referring to FIG. 7, the extending section 325 extends downward from the second lower peripheral surface 324, wherein the extending section 325 surrounds and forms an inner space S therein. The first shading layer 30 surrounds the side peripheral surface of the second peripheral portion 320B2 of the second lens 320 (including the side peripheral surface of the extending section 325). In practice, during a process of assembling the second lens 320 and the image light sensing module 330, the image sensing member 331 is disposed on the substrate 332, and then the extending section 325 of the second peripheral portion 320B2 is disposed on the substrate 332, thereby the image sensing member 331 is located in the inner space S, and the second optical valid area 320A is located above the image sensing member 331.

Referring to FIG. 8, the image light sensing module 330 of the current embodiment could further include a spacer 333 disposed on the substrate 332 and located around the image sensing member 331, wherein the extending section 325 of the second peripheral portion 320B2 of the second lens 320 is disposed on the spacer 333, thereby reducing a length of the extending section 325 of the second peripheral portion 320B2 (i.e., reducing a thickness of the second lens 320).

Referring to FIG. 9, the structures of the spacer 333 and the first shading layer 30 of the current embodiment could be changed to meet different requirements.

More specifically, the first shading layer 30 is disposed on the side peripheral surface of the first peripheral portion 310B2 of the first lens 310, and the spacer 333 has a light-shielding sheet 334 and a restricting block 335. Referring to FIG. 9, the light-shielding sheet 334 extends upward from a side of the spacer 333, and the restricting block 335 protrudes from another side of the spacer 333, wherein a recess 336 is formed between the light-shielding sheet 334 and the restricting block 335. In practice, during a process of assembling the second lens 320 and the image light sensing module 330, the extending section 325 of the second peripheral portion 320B2 of the second lens 320 is positioned in the recess 336 of the spacer 333, and the light-shielding sheet 334 surrounds the side peripheral surface of the second peripheral portion 320B2 of the second lens 320. In this way, the first shading layer 30 of the current embodiment surrounds a periphery of the first peripheral portion 310B2 of the first lens 310, and the light-shielding sheet 334 of the current embodiment surrounds a periphery of the second peripheral portion 320B2 of the second lens 320, wherein since the first shading layer 30 and the light-shielding sheet 334 have the function of blocking light, the non-imaging light could not pass through the first shading layer 30 and the light-shielding sheet 334 to enter the first peripheral portion 310B2 and the second peripheral portion 320B2, which could also provide the light-blocking effect.

In other embodiments, the first shading layer 30 could be disposed on the side peripheral surface of the second peripheral portion 320B2 of the second lens 320, and the light-shielding sheet 334 could be further disposed on the first peripheral portion 310B2 of the first lens 310 for blocking light, as long as the first shading layer 30 is disposed on at least one of the lenses; alternatively, the first shading layer 30 could be omitted, and a part of the peripheral portion of at least one of the lenses could be made of an opaque material, allowing the optical invalid area of at least one of the lenses to provide light-blocking effect to block the non-imaging light from the side peripheral surface of the peripheral portion into at least one of the lenses, further saving the light-shielding materials.

Figure 10:
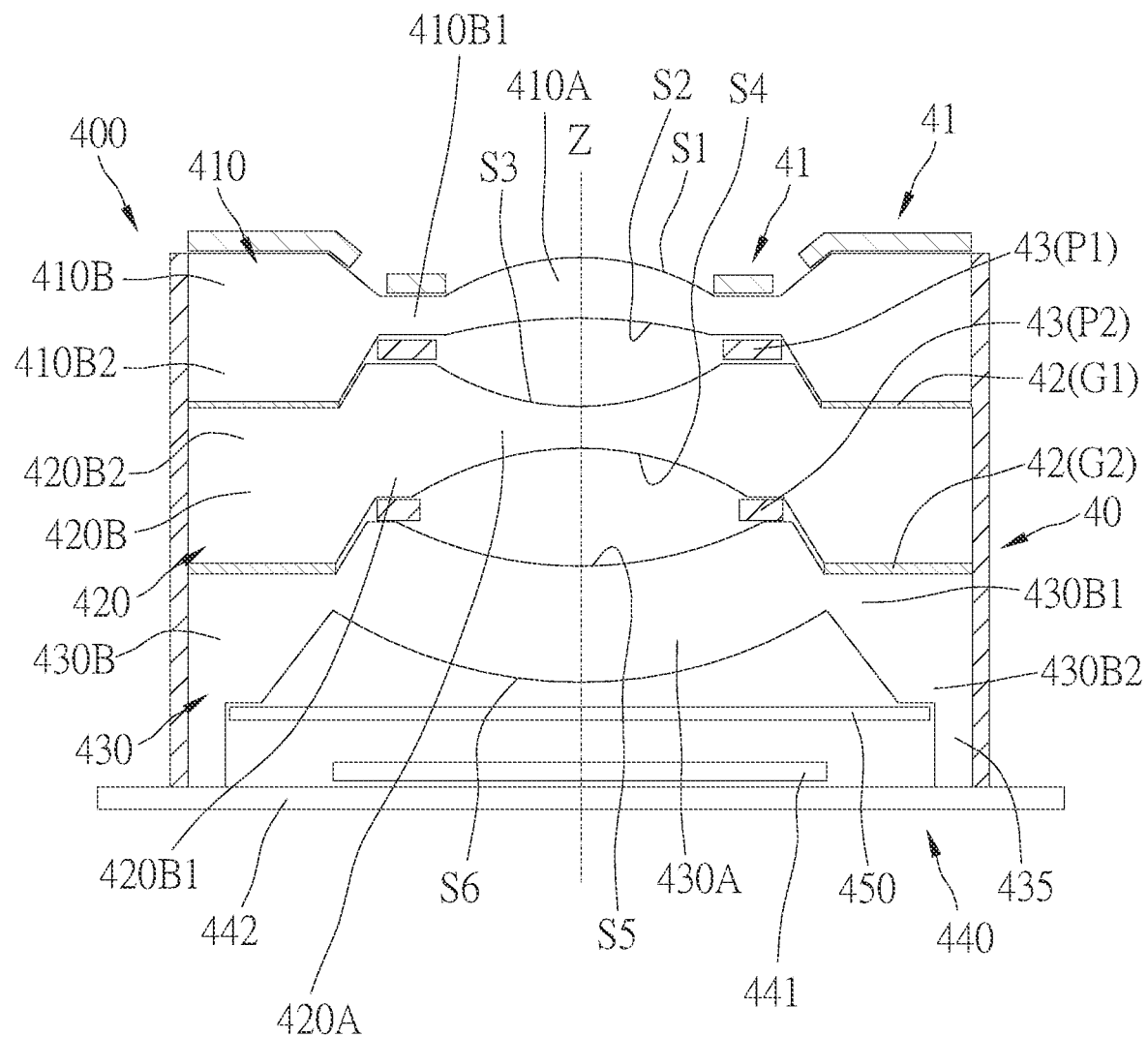
FIG. 10 is a schematic view of the optical lens according to a fourth embodiment of the present invention.
Figure 11:
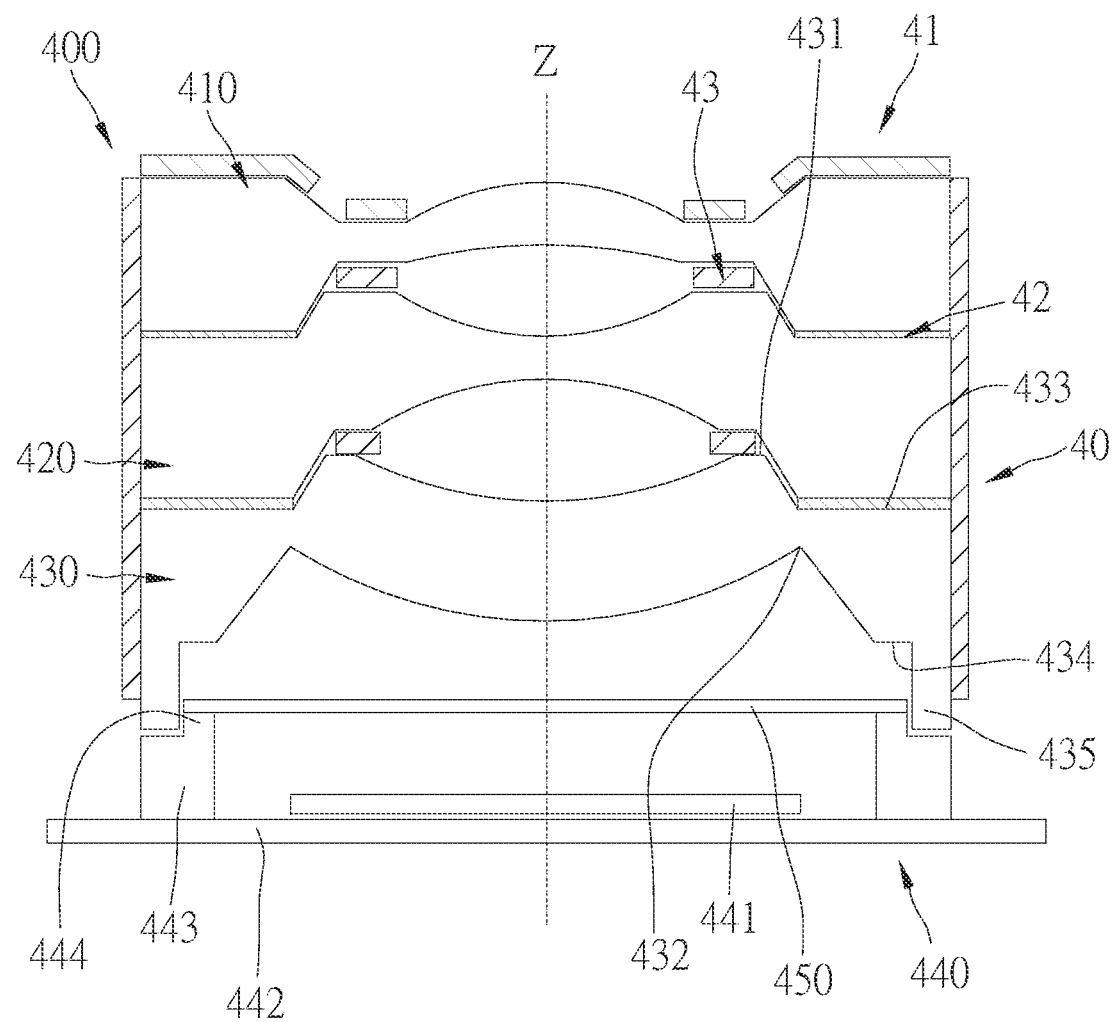
FIG. 11 is a schematic view of the optical lens according to the fourth embodiment of the present invention.

An optical lens 400 according to a fourth embodiment of the present invention is illustrated in FIG. 10 and FIG. 11 and includes a first lens 410, a second lens 420, a third lens 430, a first shading layer 40, a second shading layer 41, two third shading layers 42, two fourth shading layers 43, an image light sensing module 440, and a filter 450.

The first lens 410, the second lens 420, and the image light sensing module 440 of the optical lens 400 of the current embodiment have almost the same structure as the first lens 310, the second lens 320, and the image light sensing module 330 of the optical lens 300 of the third embodiment. In other words, the first lens 410 has a first optical valid area 410A and a first optical invalid area 410B, wherein the first optical valid area 410A has a first upper optical surface S1 and a first lower optical surface S2, and the first optical invalid area 410B has a first connecting portion 410B1 and a first peripheral portion 410B2. Similarly, the second lens 420 has a second optical valid area 420A and a second optical invalid area 420B, wherein the second optical valid area 420A has a second upper optical surface S3 and a second lower optical surface S4, and the second optical invalid area 420B has a second connecting portion 420B1 and a second peripheral portion 420B2; the image light sensing module 440 at least has an image light sensing member 441 and a substrate 442, wherein the image light sensing module 440 could include a spacer 443 (shown in FIG. 11); the second shading layer 41 of the current embodiment is disposed and arranged similarly to the second shading layer 31 of the third embodiment, thus we are not going to describe in details herein.

The difference between the optical lens 400 of the current embodiment and that of the third embodiment is that the optical lens 400 further includes the third lens 430 and the filter 450, and the arrangements of the first shading layer 40, the two third shading layers 42, and the two fourth shading layers 43 are slightly different.

The third lens 430 has a third optical valid area 430A and a third optical invalid area 430B, wherein the third optical valid area 430A has a third upper optical surface S5 and a third lower optical surface S6 that face opposite directions. The third optical valid area 430A is a concave-convex type (i.e., the third upper optical surface S5 is a concave surface, the third lower optical surface S6 is a convex surface), and the third upper optical surface S5 and the third lower optical surface S6 are adapted to be passed through by the optical axis Z of the image light.

The third optical invalid area 430B surrounds a periphery of the third optical valid area 430A and has a third connecting portion 430B1 and a third peripheral portion 430B2, wherein a side of the third connecting portion 430B1 is connected to the third optical valid area 430A, and another side of the third connecting portion 430B1 is connected to the third peripheral portion 430B2, so that the third peripheral portion 430B2 could be located on an outer periphery of the third lens 430 relative to the third optical valid area 430A, and the third connecting portion 430B1 is connected between the third peripheral portion 430B2 and the third optical valid area 430A.

Referring to FIG. 10, the third connecting portion 430B1 has a third upper connecting surface 431 and a third lower connecting surface 432 that face opposite directions, wherein the third upper connecting surface 431 is connected to a periphery of the third upper optical surface S5, and the third lower connecting surface 432 is connected to a periphery of the third lower optical surface S6; the third peripheral portion 430B2 has a third upper peripheral surface 433 and a third lower peripheral surface 434 that face opposite directions, wherein the third peripheral portion 430B2 tilts upward from both the third upper peripheral surface 433 and the third lower peripheral surface 434 toward the second lens 420 to be connected to the third connecting portion 430B1.

Referring to FIG. 10, the second peripheral portion 420B2 of the second lens 420 is disposed on the third peripheral portion 430B2 of the third lens 430, wherein a peripheral gap G2 is formed between the second peripheral portion 420B2 and the third peripheral portion 430B2, and a connection gap P2 is formed between the second connecting portion 420B1 and the third connecting portion 430B1; the second optical valid area 420A of the second lens 420 faces the third optical valid area 430A of the third lens 430, so that the optical axis Z of the image light could pass through the second optical valid area 420A and the third optical valid area 430A.

Additionally, the third peripheral portion 430B2 of the third lens 430 has an extending section 435 extending downward from the third lower peripheral surface 434 (as shown in FIG. 10 and FIG. 11), wherein the extending section 435 is disposed above the substrate 442 of the image light sensing module 440, the image sensing member 441 is located on the substrate 442, and the third optical valid area 430A is located above the image sensing member 441. As the way of setting the third lens 430 and the image light sensing module 440 of the current embodiment is almost the same as the way of setting the second lens 320 and the image light sensing module 330 of the third embodiment, thus we are not going to describe in details herein.

Moreover, the filter 450 is disposed between the third lens 430 and the image sensing member 441, and does not affect a focal length of the optical lens 400 of the current embodiment. Referring to FIG. 10, the filter 450 is connected to the third lower peripheral surface 434 of the third lens 430 and is located above the image sensing member 441. However, the arrangement of the filter 450 is not limited by the aforementioned design. Referring to FIG. 11, the filter 450 abuts against the restricting block 444 of the spacer 443 and is located above the image sensing member 441.

Referring to FIG. 10 and FIG. 11, in the current embodiment, the first shading layer 40 is disposed on the side peripheral surface of the first peripheral portion 410B2 of the first lens 410, the side peripheral surface of the second peripheral portion 420B2 of the second lens 420, and the side peripheral surface of the third peripheral portion 430B2 of the third lens 430, wherein the third lens 430 of the first shading layer 40 surrounds the side peripheral surface of the extending section 435 of the third peripheral portion 430B2; the two third shading layers 42 are respectively disposed in the peripheral gap G1 formed between the first peripheral portion 410B2 and the second peripheral portion 420B2 and the peripheral gap G2 formed between the second peripheral portion 420B2 and the third peripheral portion 430B2; the two fourth shading layers 43 are respectively disposed in the connection gap P1 formed between the first connecting portion 410B1 and the second connecting portion 420B1 and the connection gap P2 formed between the second connecting portion 420B1 and the third connecting portion 430B1, wherein the way of setting the first shading layer 40, the second shading layer 41, each of the third shading layers 42, and each of the fourth shading layers 43 is the same as that of the first embodiment (e.g. by screen printing, coating, and attaching). In this way, the arrangement of the shading layers of the current embodiment could be changed depending on the number of lenses to meet different requirements, allowing the optical lens 400 to have the function of blocking light.

Figure 12:
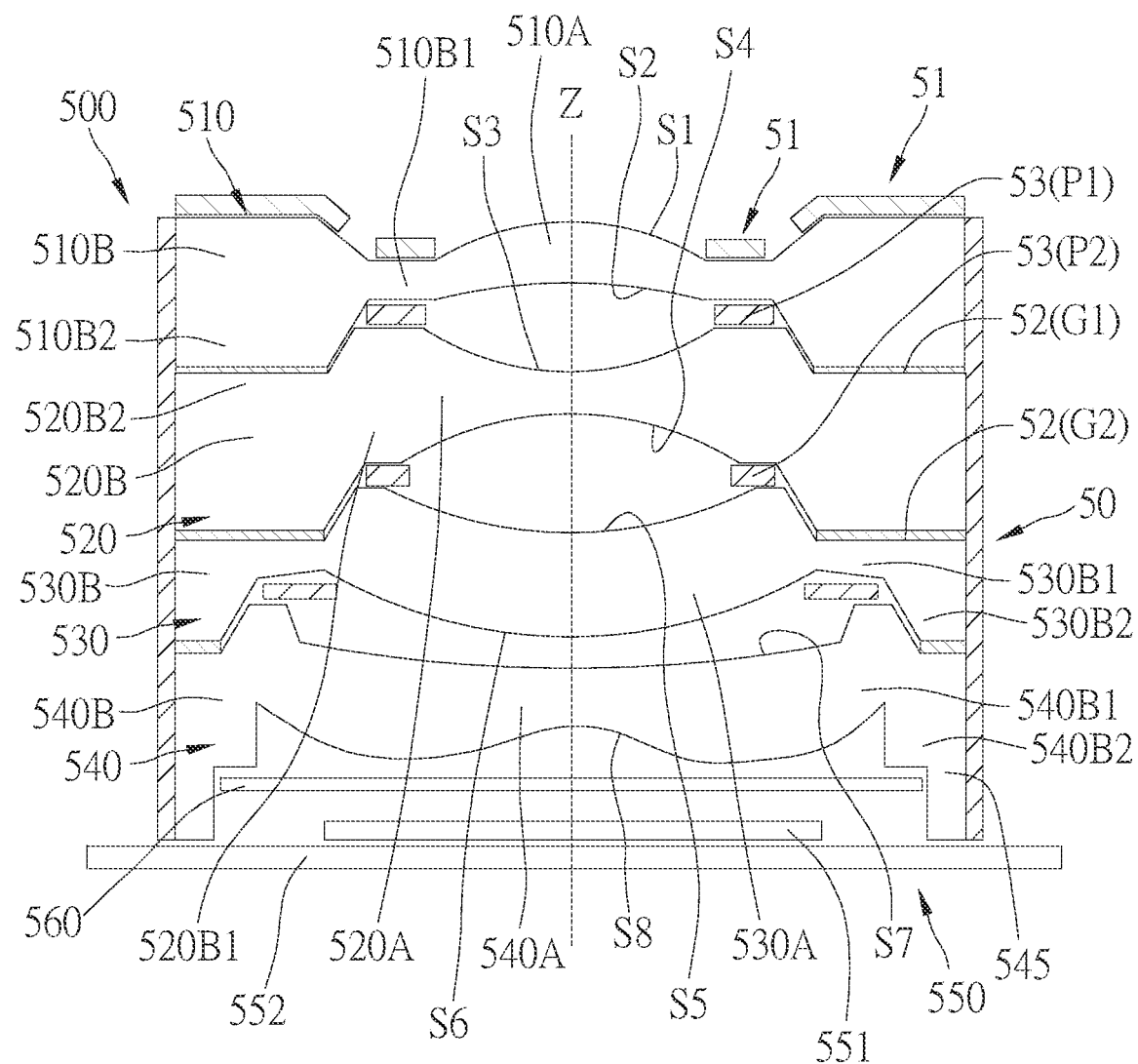
FIG. 12 is a schematic view of the optical lens according to a fifth embodiment of the present invention.
Figure 13:
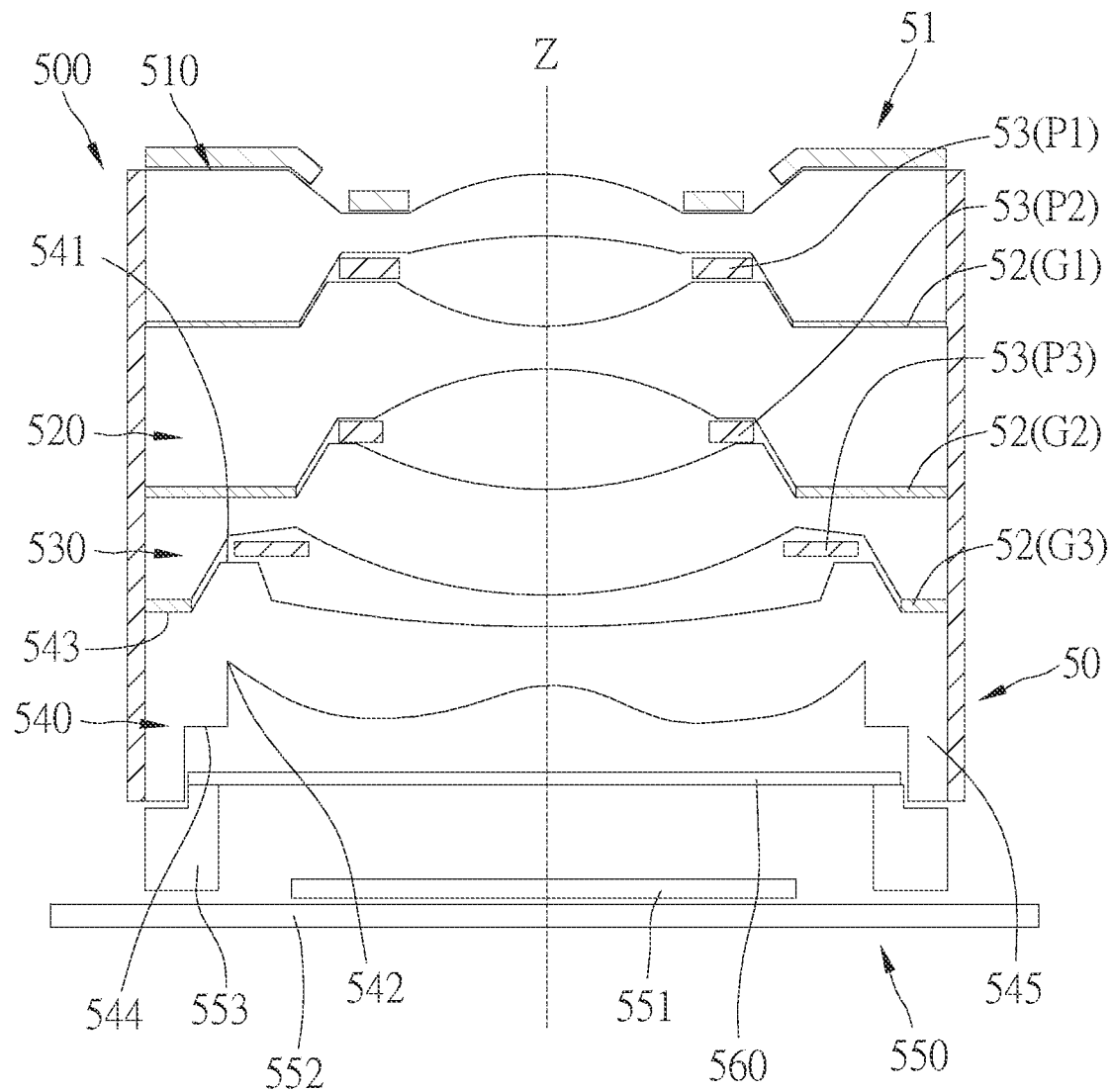
FIG. 13 is a schematic view of the optical lens according to the fifth embodiment of the present invention.

An optical lens 500 according to a fifth embodiment of the present invention is illustrated in FIG. 12 and FIG. 13 and includes a first lens 510, a second lens 520, a third lens 530, a fourth lens 540, a first shading layer 50, a second shading layer 51, three third shading layers 52, three fourth shading layers 53, an image light sensing module 550, and a filter 560, wherein the first lens 510, the second lens 520, the third lens 530, and the image light sensing module 550 of the current embodiment has almost the same structure as the first lens 410, the second lens 420, the third lens 430, and the image light sensing module 440 of the fourth embodiment.

In other words, the first lens 510 of the current embodiment has a first optical valid area 510A and a first optical invalid area 510B, wherein the first optical valid area 510A has a first upper optical surface S1 and a first lower optical surface S2 and the first optical invalid area 510B has a first connecting portion 510B1 and a first peripheral portion 510B2; the second lens 520 has a second optical valid area 520A and a second optical invalid area 520B; the second optical valid area 520A has a second upper optical surface S3 and a second lower optical surface S4 and the second optical invalid area 520B has a second connecting portion 520B1 and a second peripheral portion 520B2; the third lens 530 has a third optical valid area 530A and a third optical invalid area 530B; the third optical valid area 530A has a third upper optical surface S5 and a third lower optical surface S6 and the third optical invalid area 530B has a third connecting portion 530B1 and a third peripheral portion 530B2; the image light sensing module 550 at least has an image light sensing member 551 and a substrate 552; the image light sensing module 550 could further include a spacer 553 (as shown in FIG. 13); the second shading layer 51 of the current embodiment is disposed and arranged similarly to the second shading layer 41 of the fourth embodiment, thus we are not going to describe in details herein.

The difference between the optical lens 500 of the current embodiment and that of the fourth embodiment is that the optical lens 500 of the current embodiment further includes the fourth lens 540, and the arrangements of the first shading layer 50, the three third shading layers 52, and the three fourth shading layers 53 are slightly different.

Referring to FIG. 12 and FIG. 13, the fourth lens 540 has a fourth optical valid area 540A and a fourth optical invalid area 540B, wherein the fourth optical valid area 540A has a fourth upper optical surface S7 and a fourth lower optical surface S8 that face opposite directions. The fourth optical valid area 540A is a biconcave type (i.e., the fourth upper optical surface S7 is a concave surface, and the fourth lower optical surface S8 is a concave surface), wherein the fourth upper optical surface S7 and the fourth lower optical surface S8 are adapted to be passed through by the optical axis Z of the image light.

The fourth optical invalid area 540B surrounds a periphery of the fourth optical valid area 540A and has a fourth connecting portion 540B1 and a fourth peripheral portion 540B2, wherein a side of the fourth connecting portion 540B1 is connected to the fourth optical valid area 540A, and another side of the fourth connecting portion 540B1 is connected to the fourth peripheral portion 540B2, so that the fourth peripheral portion 540B2 could be located on an outer periphery of the fourth lens 540 relative to the fourth optical valid area 540A, and the fourth connecting portion 540B1 is connected between the fourth peripheral portion 540B2 and the fourth optical valid area 540A.

Referring to FIG. 12, the fourth connecting portion 540B2 has a fourth upper connecting surface 541 and a fourth lower connecting surface 542 that face opposite directions, wherein the fourth upper connecting surface 541 is connected to a periphery of the fourth upper optical surface S7, and the fourth lower connecting surface 542 is connected to a periphery of the fourth lower optical surface S8; the fourth peripheral portion 540B2 has a fourth upper peripheral surface 543 and a fourth lower peripheral surface 544 that face opposite directions, wherein the fourth peripheral portion 540B2 tilts upward from both the fourth upper peripheral surface 543 and the fourth lower peripheral surface 544 toward the third lens 530 to be connected to the fourth connecting portion 540B1.

In the current embodiment, the third peripheral portion 530B2 of the third lens 530 is disposed on the fourth peripheral portion 540B2 of the fourth lens 540, wherein a peripheral gap G3 is formed between the third peripheral portion 530B2 and the fourth peripheral portion 540B2, and a connection gap P3 is formed between the third connecting portion 530B1 and the fourth connecting portion 540B1; the third optical valid area 530A of the third lens 530 and the fourth optical valid area 540A of the fourth lens 540 face each other, and the optical axis Z of the image light passes through the third optical valid area 530A and the fourth optical valid area 540A.

Additionally, the fourth peripheral portion 540B2 has an extending section 545 extending downward from the fourth lower peripheral surface 544 (as shown in FIG. 12 and FIG. 13), wherein the extending section 545 is disposed above the substrate 552 of the image light sensing module 550, the image sensing member 551 is disposed on the substrate 552, and the fourth optical valid area 540A is located above the image sensing member 551.

Referring to FIG. 12 and FIG. 13, in the current embodiment, the first shading layer 50 is disposed on the side peripheral surface of the first peripheral portion 510B2 of the first lens 510, the side peripheral surface of the second peripheral portion 520B2 of the second lens 520, the side peripheral surface of the third peripheral portion 530B2 of the third lens 530, and the side peripheral surface of the fourth peripheral portion 540B2 of the fourth lens 540, wherein the first shading layer 50 further surrounds the side peripheral surface of the extending section 545 of the fourth peripheral portion 540B2 of the fourth lens 540; the three third shading layers 52 are respectively disposed in the three peripheral gaps G1, G2, G3, and the three fourth shading layers 53 are respectively disposed in the three connection gaps P1, P2, P3, wherein the way of setting the first shading layer 50, the second shading layer 51, each of the third shading layers 52, and each of the fourth shading layers 53 is the same as that of the first embodiment (e.g. by screen printing, coating, and attaching). In this way, the arrangement of the shading layers of the current embodiment could be changed depending on the number of lenses to meet different requirements, allowing the optical lens 500 to have the function of blocking light.

Figure 14:
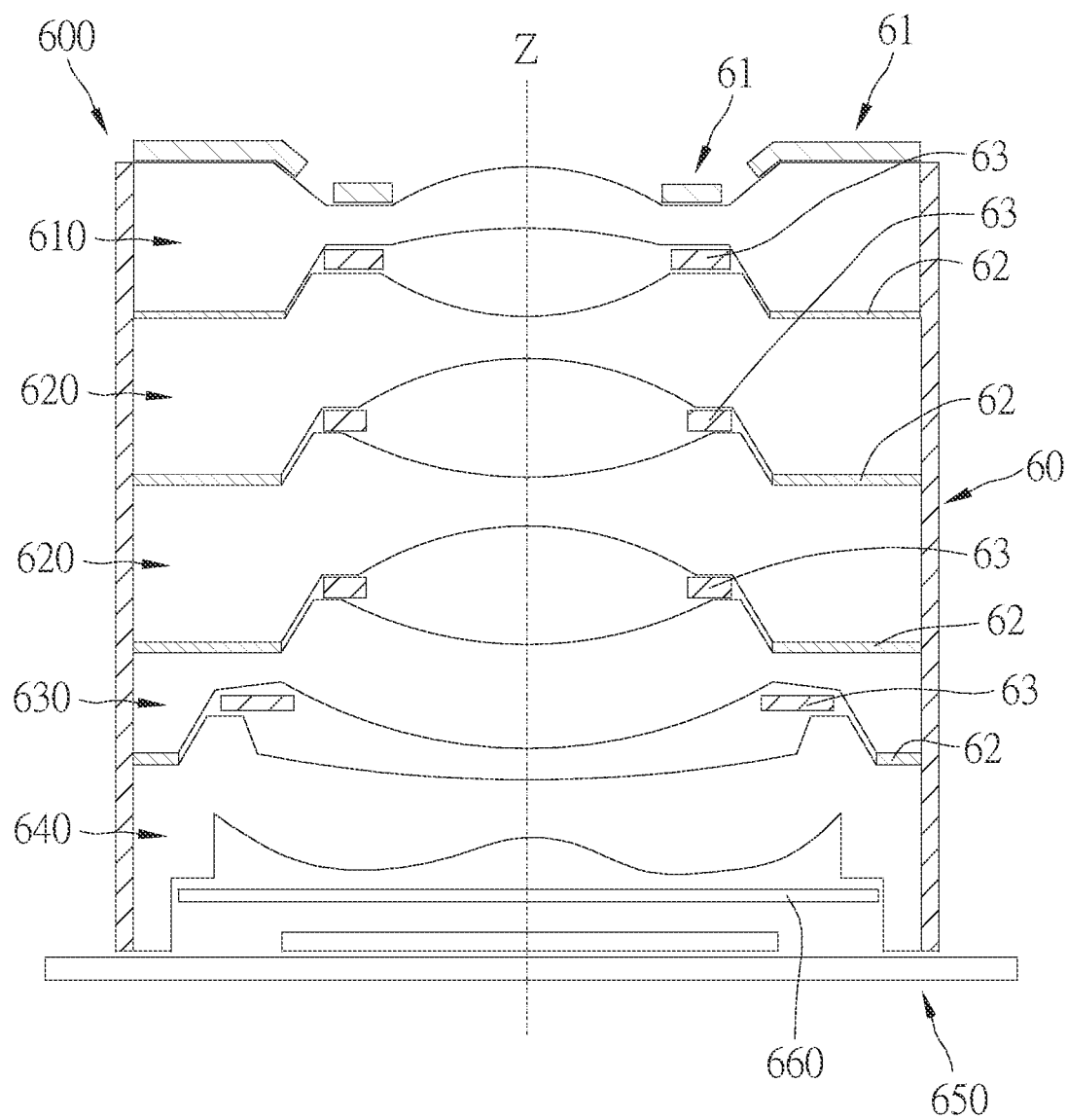
FIG. 14 is a schematic view of the optical lens according to a sixth embodiment of the present invention.
Figure 15:
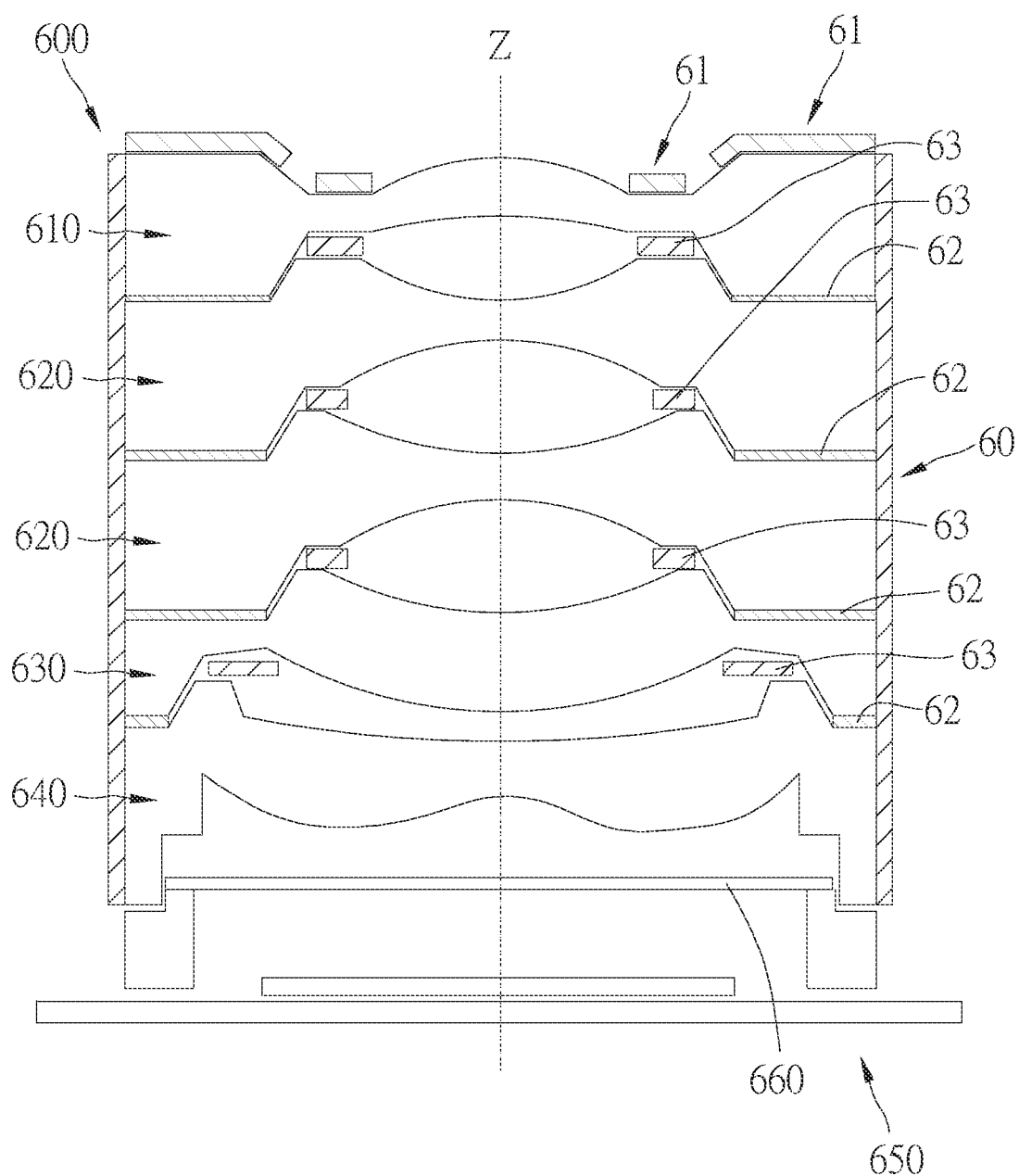
FIG. 15 is a schematic view of the optical lens according to the sixth embodiment of the present invention.

An optical lens 600 according to a sixth embodiment of the present invention is illustrated in FIG. 14 and FIG. 15 and includes five lenses, a first shading layer 60, a second shading layer 61, four third shading layers 62, four fourth shading layers 63, an image light sensing module 650, and a filter 660, wherein the five lenses, in order along the optical axis Z, have a first lens 610, two second lenses 620, a third lens 630, and a fourth lens 640. The first lens 610, the second lens 620, the third lens 630, the fourth lens 640, and the image light sensing module 650 of the current embodiment has almost the same structure as the first lens 510, the second lens 520, the third lens 530, the fourth lens 540, and the image light sensing module 550 of the fifth embodiment; the first shading layer 60 to the fourth shading layer 63 of the current embodiment are disposed and arranged similarly to the first shading layer 50 to the fourth shading layer 53 of the fifth embodiment, thus we are not going to describe in details herein.

The difference between the optical lens 600 of the current embodiment and that of the fifth embodiment is that the optical lens 600 of the current embodiment includes the two second lenses 620. More specifically, the two second lenses 620 are disposed between the first lens 610 and the third lens 630, and the two second lenses 620 are both biconcave type, wherein the way of setting the first shading layer 60, the second shading layer 61, each of the third shading layers 62, and each of the fourth shading layers 63 is the same as that of the first embodiment (e.g. by screen printing, coating, and attaching). In this way, the arrangement of the shading layers of the current embodiment could be changed depending on the number of lenses to meet different requirements, allowing the optical lens 600 to have the function of blocking light.

Figure 16:
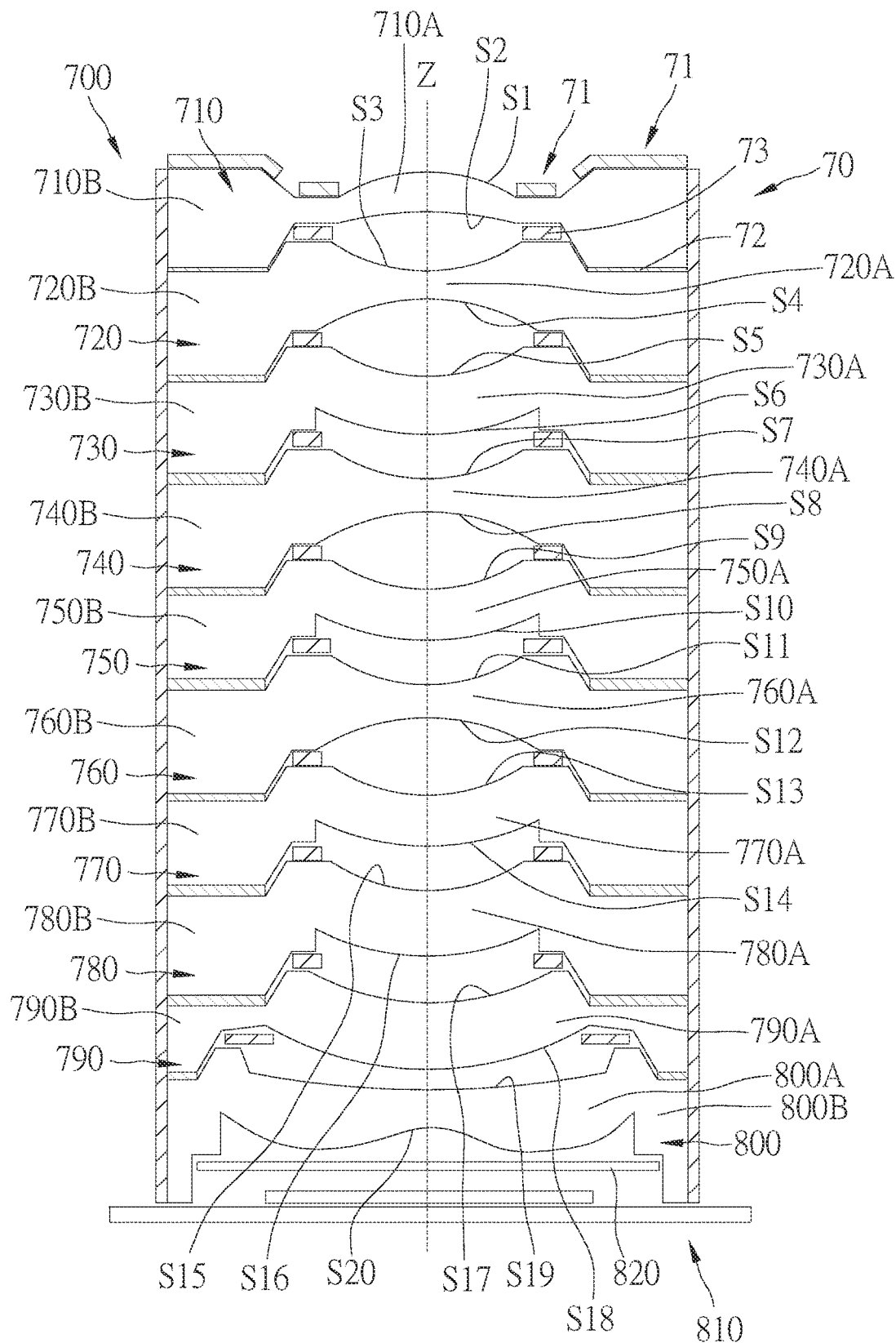
FIG. 16 is a schematic view of the optical lens according to a seventh embodiment of the present invention.
Figure 17:
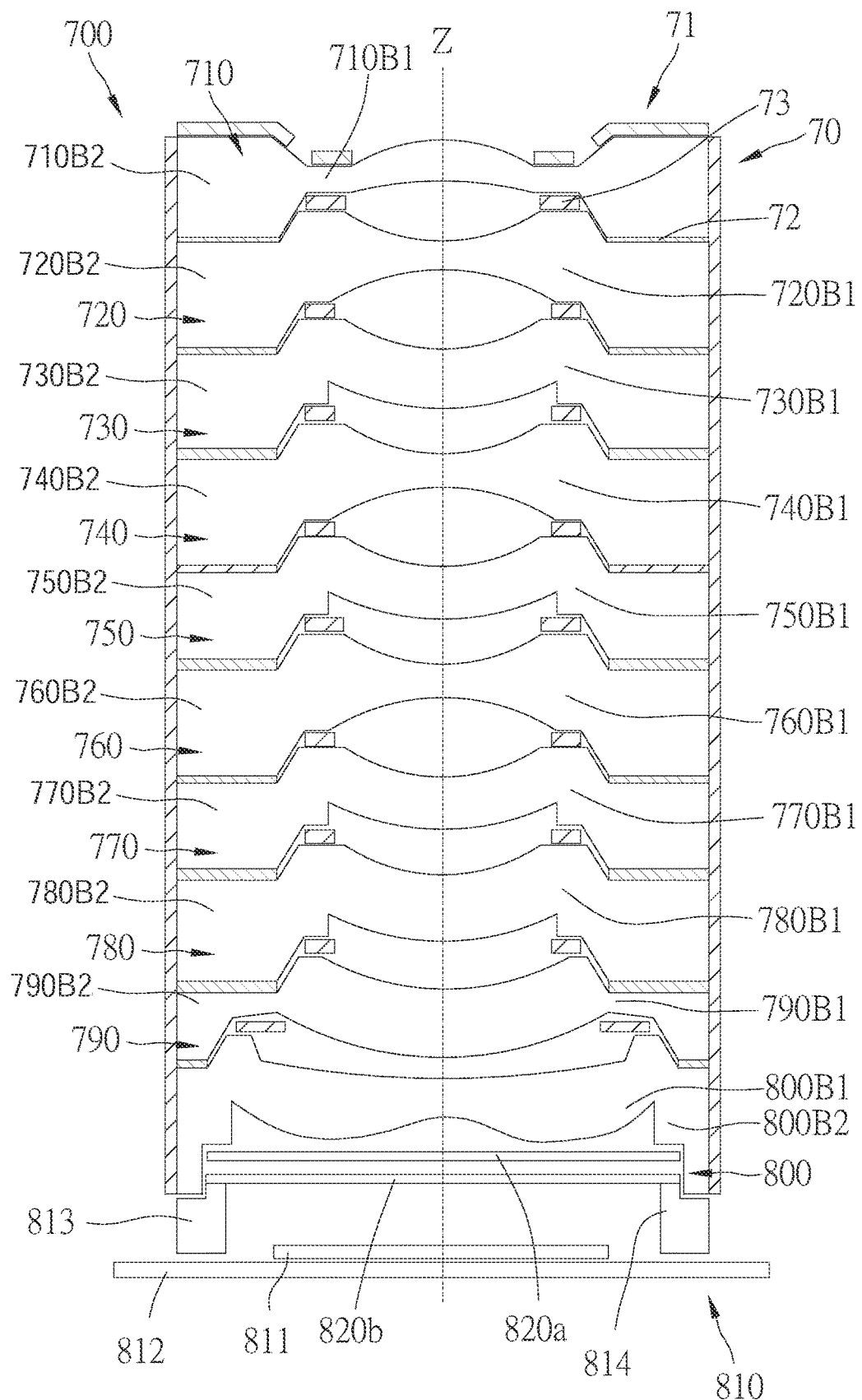
FIG. 17 is a schematic view of the optical lens according to the seventh embodiment of the present invention.

An optical lens 700 according to a seventh embodiment of the present invention is illustrated in FIG. 16 and FIG. 17 and includes ten lenses, a first shading layer 70, a second shading layer 71, a plurality of third shading layers 72, a plurality of fourth shading layer 73, an image light sensing module 810, and at least one filter 820, wherein the ten lenses, in order along the optical axis Z, have a first lens 710, a second lens 720, a third lens 730, a fourth lens 740, a fifth lens 750, a sixth lens 760, a seventh lens 770, an eighth lens 780, a ninth lens 790, and a tenth lens 800.

The first lens 710 has a first optical valid area 710A and a first optical invalid area 710B. Referring to FIG. 16 and FIG. 17, the first optical valid area 710A has a first upper optical surface S1 and a first lower optical surface S2, wherein the first optical valid area 710A is a convex-concave type (i.e., the first upper optical surface S1 is a convex surface and the first lower optical surface S2 is a concave surface), and the first upper optical surface S1 and the first lower optical surface S2 are adapted to be passed through by the optical axis Z of the image light.

The first optical invalid area 710B surrounds a periphery of the first optical valid area 710A. Referring to FIG. 16 and FIG. 17, the first optical invalid area 710B has a first connecting portion 710B1 and a first peripheral portion 710B2, wherein a side of the first connecting portion 710B1 is connected to the first optical valid area 710A, and another side of the first connecting portion 710B1 is connected to the first peripheral portion 710B2, so that the first peripheral portion 710B2 could be located on an outer periphery of the first lens 710 relative to the first optical valid area 710A, and the first connecting portion 710B1 is connected between the first peripheral portion 710B2 and the first optical valid area 710A.

The second lens 720 has a second optical valid area 720A and a second optical invalid area 720B. Referring to FIG. 16 and FIG. 17, the second optical valid area 720A has a second upper optical surface S3 and a second lower optical surface S4 that face opposite directions, wherein the second optical valid area 720A is a biconcave type (i.e., the second upper optical surface S3 is a concave surface, and the second lower optical surface S4 is a concave surface), and the second upper optical surface S3 and the second lower optical surface S4 are adapted to be passed through by the optical axis Z of the image light.

The second optical invalid area 720B surrounds a periphery of the second optical valid area 720A. Referring to FIG. 16 and FIG. 17, the second optical invalid area 720B has a second connecting portion 720B1 and a second peripheral portion 720B2, wherein a side of the second connecting portion 720B1 is connected to the second optical valid area 720A, and another side of the second connecting portion 720B1 is connected to the second peripheral portion 720B2, so that the second peripheral portion 720B2 could be located on an outer periphery of the second lens 720 relative to the second optical valid area 720A, and the second connecting portion 720B1 is connected between the second peripheral portion 720B2 and the second optical valid area 720A.

The third lens 730 has a third optical valid area 730A and a third optical invalid area 730B, wherein the third optical valid area 730A has a third upper optical surface S5 and a third lower optical surface S6 that face opposite directions, wherein the third optical valid area 730A is a concave-convex type (i.e., the third upper optical surface S5 is a concave surface, and the third lower optical surface S6 is a convex surface), and the third upper optical surface S5 and the third lower optical surface S6 are adapted to be passed through by the optical axis Z of the image light.

The third optical invalid area 730B surrounds a periphery of the third optical valid area 730A. Referring to FIG. 16 and FIG. 17, the third optical invalid area 730B has a third connecting portion 730B1 and a third peripheral portion 730B2, wherein a side of the third connecting portion 730B1 is connected to the third optical valid area 730A, and another side of the third connecting portion 730B1 is connected to the third peripheral portion 730B2, so that the third peripheral portion 730B2 could be located on an outer periphery of the third lens 730 relative to the third optical valid area 730A, and the third connecting portion 730B1 is connected between the third peripheral portion 730B2 and the third optical valid area 730A.

The structure of the fourth lens 740 is similar to the structure of the second lens 720. The fourth lens 740 has a fourth optical valid area 740A and a fourth optical invalid area 740B, wherein the fourth optical valid area 740A has a fourth upper optical surface S7 and a fourth lower optical surface S8 that face opposite directions. The fourth optical valid area 740A is similar to the second optical valid area 720A and is a biconcave type (i.e., the fourth upper optical surface S7 is a concave surface, and the fourth lower optical surface S8 is a concave surface), and the fourth upper optical surface S7 and the fourth lower optical surface S8 are adapted to be passed through by the optical axis Z of the image light.

The fourth optical invalid area 740B surrounds a periphery of the fourth optical valid area 740A. Referring to FIG. 16 and FIG. 17, the fourth optical invalid area 740B has a fourth connecting portion 740B1 and a fourth peripheral portion 740B2, wherein a side of the fourth connecting portion 740B1 is connected to the fourth optical valid area 740A, and another side of the fourth connecting portion 740B1 is connected to the fourth peripheral portion 740B2, so that the fourth peripheral portion 740B2 could be located on an outer periphery of the fourth lens 740 relative to the fourth optical valid area 740A, and the fourth connecting portion 740B1 is connected between the fourth peripheral portion 740B2 and the fourth optical valid area 740A.

The structure of the fifth lens 750 is similar to the structure of the third lens 730. The fifth lens 750 has a fifth optical valid area 750A and a fifth optical invalid area 750B, wherein the fifth optical valid area 750A has a fifth upper optical surface S9 and a fifth lower optical surface S10 that face opposite directions. The fifth optical valid area 750A is similar to the third optical valid area 730A and is a concave-convex type (i.e., the fifth upper optical surface S9 is a concave surface, and the fifth lower optical surface S10 is a convex surface), and the fifth upper optical surface S9 and the fifth lower optical surface S10 are adapted to be passed through by the optical axis Z of the image light.

The fifth optical invalid area 750B surrounds a periphery of the fifth optical valid area 750A. Referring to FIG. 16 and FIG. 17, the fifth optical invalid area 750B has a fifth connecting portion 750B1 and a fifth peripheral portion 750B2, wherein a side of the fifth connecting portion 750B1 is connected to the fifth optical valid area 750A, and another side of the fifth connecting portion 750B1 is connected to the fifth peripheral portion 750B2, so that the fifth peripheral portion 750B2 could be located on an outer periphery of the fifth lens 750 relative to the fifth optical valid area 750A, and the fifth connecting portion 750B1 is connected between the fifth peripheral portion 750B2 and the fifth optical valid area 750A.

The structure of the sixth lens 760 is similar to the structure of the second lens 720 and the structure of the fourth lens 740. The sixth lens 760 has a sixth optical valid area 760A and a sixth optical invalid area 760B, wherein the sixth optical valid area 760A has a sixth upper optical surface S11 and a sixth lower optical surface S12 that face opposite directions. The sixth optical valid area 760A is a biconcave type (i.e., the sixth upper optical surface S11 is a concave surface, and the sixth lower optical surface S12 is a concave surface), and the sixth upper optical surface S11 and the sixth lower optical surface S12 are adapted to be passed through by the optical axis Z of the image light.

The sixth optical invalid area 760B surrounds a periphery of the sixth optical valid area 760A. Referring to FIG. 16 and FIG. 17, the sixth optical invalid area 760B has a sixth connecting portion 760B1 and a sixth peripheral portion 760B2, wherein a side of the sixth connecting portion 760B1 is connected to the sixth optical valid area 760A, and another side of the sixth connecting portion 760B1 is connected to the sixth peripheral portion 760B2, so that the sixth peripheral portion 760B2 could be located on an outer periphery of the sixth lens 760 relative to the sixth optical valid area 760A, and the sixth connecting portion 760B1 is connected between the sixth peripheral portion 760B2 and the sixth optical valid area 760A.

The structure of the seventh lens 770 is similar to the structure of the third lens 730. The seventh lens 770 has a seventh optical valid area 770A and a seventh optical invalid area 770B, wherein the seventh optical valid area 770A has a seventh upper optical surface S13 and a seventh lower optical surface S14 that face opposite directions. The seventh optical valid area 770A is similar to the third optical valid area 730A and is a concave-convex type (i.e., the seventh upper optical surface S13 is a concave surface, and the seventh lower optical surface S14 is a convex surface), and the seventh upper optical surface S13 and the seventh lower optical surface S14 are adapted to be passed through by the optical axis Z of the image light.

The seventh optical invalid area 770B surrounds a periphery of the seventh optical valid area 770A. Referring to FIG. 16 and FIG. 17, the seventh optical invalid area 770B has a seventh connecting portion 770B1 and a seventh peripheral portion 770B2, wherein a side of the seventh connecting portion 770B1 is connected to the seventh optical valid area 770A, and another side of the seventh connecting portion 770B1 is connected to the seventh peripheral portion 770B2, so that the seventh peripheral portion 770B2 could be located on an outer periphery of the seventh lens 770 relative to the seventh optical valid area 770A, and the seventh connecting portion 770B1 is connected between the seventh peripheral portion 770B2 and the seventh optical valid area 770A.

The structure of the eighth lens 780 is similar to the structure of the seventh lens 770. The eighth lens 780 has an eighth optical valid area 780A and an eighth optical invalid area 780B, wherein the eighth optical valid area 780A has an eighth upper optical surface S15 and an eighth lower optical surface S16 that face opposite directions. The eighth optical valid area 780A is similar to the seventh optical valid area 770A and is a concave-convex type (i.e., the eighth upper optical surface S15 is a concave surface, and the eighth lower optical surface S16 is a convex surface), and the eighth upper optical surface S15 and the eighth lower optical surface S16 are adapted to be passed through by the optical axis Z of the image light.

The eighth optical invalid area 780B surrounds a periphery of the eighth optical valid area 780A. Referring to FIG. 16 and FIG. 17, the eighth optical invalid area 780B has an eighth connecting portion 780B1 and an eighth peripheral portion 780B2, wherein a side of the eighth connecting portion 780B1 is connected to the eighth optical valid area 780A, and another side of the eighth connecting portion 780B1 is connected to the eighth peripheral portion 780B2, so that the eighth peripheral portion 780B2 could be located on an outer periphery of the eighth lens 780 relative to the eighth optical valid area 780A, and eighth connecting portion 780B1 is connected between the eighth peripheral portion 780B2 and the eighth optical valid area 780A.

The ninth lens 790 has a ninth optical valid area 790A and a ninth optical invalid area 790B, wherein the ninth optical valid area 790A has a ninth upper optical surface S17 and a ninth lower optical surface S18 that face opposite directions. Th ninth optical valid area 790A is a concave-convex type (i.e., the ninth upper optical surface S17 is a concave surface, and the ninth lower optical surface S18 is a convex surface), and the ninth upper optical surface S17 and the ninth lower optical surface S18 are adapted to be passed through by the optical axis Z of the image light.

The ninth optical invalid area 790B surrounds a periphery of the ninth optical valid area 790A. Referring to FIG. 16 and FIG. 17, the ninth optical invalid area 790B has a ninth connecting portion 790B1 and a ninth peripheral portion 790B2, wherein a side of the ninth connecting portion 790B1 is connected to the ninth optical valid area 790A, and another side of the ninth connecting portion 790B1 is connected to the ninth peripheral portion 790B2, so that the ninth peripheral portion 790B2 could be located on an outer periphery of the ninth lens 790 relative to the ninth optical valid area 790A, and the ninth connecting portion 790B1 is connected between the ninth peripheral portion 790B2 and the ninth optical valid area 790A.

The tenth lens 800 has a tenth optical valid area 800A and a tenth optical invalid area 800B, wherein the tenth optical valid area 800A has a tenth upper optical surface S19 and a tenth lower optical surface S20 that face opposite directions. The tenth optical valid area 800A is a biconcave type (i.e., the tenth upper optical surface S19 is a concave surface and the tenth lower optical surface S20 is a concave surface), and the tenth upper optical surface S19 and the tenth lower optical surface S20 are adapted to be passed through by the optical axis Z of the image light.

The tenth optical invalid area 800B surrounds a periphery of the tenth optical valid area 800A. Referring to FIG. 16 and FIG. 17, the tenth optical invalid area 800B has a tenth connecting portion 800B1 and a tenth peripheral portion 800B2, wherein a side of the tenth connecting portion 800B1 is connected to the tenth optical valid area 800A, and another side of the tenth connecting portion 800B1 is connected to the tenth peripheral portion 800B2, so that the tenth peripheral portion 800B2 could be located on an outer periphery of the tenth lens 800 relative to the tenth optical valid area 800A, and the tenth connecting portion 800B1 is connected between the tenth peripheral portion 800B2 and the tenth optical valid area 800A.

Additionally, the tenth peripheral portion 800B2 has an extending section 801 disposed above the substrate 812 of the image light sensing module 810 (as shown in FIG. 16 and FIG. 17), the image sensing member 811 is located on the substrate 812, and the tenth optical valid area 800A is located above the image sensing member 811.

The filter 820 is disposed between the tenth lens 800 and the image sensing member 811, and does not affect a focal length of the optical lens 700 of the current embodiment. Referring to FIG. 16, the number of the filter 820 is one, wherein the filter 820 is disposed on a bottom side of the tenth peripheral portion 800B2 of the tenth lens 800 and is located above the image sensing member 811. However, the arrangement of the filter 820 is not limited by the aforementioned design. Referring to FIG. 17, the number of the filter is two (i.e., the filters 820*a*, 820*b*), wherein one of the filters (i.e., the filter 820*a*) abuts against the restricting block 814 of the spacer 813 of the image light sensing module 810, while the other filter 820*b* is disposed on the bottom side of the tenth peripheral portion 800B2 of the tenth lens 800, and the two filters 820*a*, 820*b* face each other.

Referring to FIG. 16 and FIG. 17, in the current embodiment, the first shading layer 70 surrounds the side peripheral surfaces of the first lens 710 to the tenth lens 800; the second shading layer 71 is disposed on both the first peripheral portion 710B2 and the first connecting portion 710B1 of the first lens 710; the third shading layers 72 are respectively disposed in the peripheral gaps (not shown) of the first lens 710 to the tenth lens 800; the fourth shading layers 73 are respectively disposed in the connection gaps (not shown) of the first lens 710 to the tenth lens 800, wherein the way of setting the first shading layer 70, the second shading layer 71, each of the third shading layers 72, and each of the fourth shading layers 73 is the same as that of the first embodiment (e.g. by screen printing, coating, and attaching). In this way, the arrangement of the shading layers of the current embodiment could be changed depending on the number of lenses to meet different requirements, allowing the optical lens 700 to have the function of blocking light.

In other embodiments, the first shading layer 70 could be disposed on the peripheral portion of at least one of the lenses of the optical lens depending on the required demand, and the second shading layer 71 could be further disposed on the upper peripheral surface of at least one of the lenses, and at least one of the lenses with the first shading layer 70 is assembled with other lenses without light-shielding characteristics, wherein the light-shielding sheet could be further disposed to cover the side peripheral surface of the lenses without light-shielding characteristics, allowing the optical lens to have the function of blocking light; alternatively, the peripheral portion of at least one of the lenses could be opaque, allowing the optical invalid area of at least one of the lenses have the function of blocking light, thereby omitting the first shading layer 70 and saving more light-shielding materials.

It must be pointed out that the embodiments described above are only some preferred embodiments of the present invention. All equivalent structures which employ the concepts disclosed in this specification and the appended claims should fall within the scope of the present invention.

What is claimed is:

1. An optical lens for being passed through by an image light, comprising:
    a first lens having a first optical valid area and a first optical invalid area, wherein the first optical invalid area surrounds the first optical valid area and has a first peripheral portion and a first connecting portion; a side of the first connecting portion is connected to the first optical valid area, and another side of the first connecting portion is connected to the first peripheral portion;
    a second lens having a second optical valid area and a second optical invalid area, wherein the second optical invalid area surrounds the second optical valid area and has a second peripheral portion and a second connecting portion; a side of the second connecting portion is connected to the second optical valid area, and another side of the second connecting portion is connected to the second peripheral portion; the second peripheral portion is disposed on the first peripheral portion, and the second optical valid area faces the first optical valid area, allowing the image light to pass through the first optical valid area and the second optical valid area;
    a first shading layer made of an opaque material and attached to a side peripheral surface of the first peripheral portion and/or a side peripheral surface of the second peripheral portion, allowing the first shading layer to correspondingly surround the first optical invalid area and/or the second optical invalid area; and
    a second shading layer made of an opaque material, wherein the first optical valid area has a first upper optical surface and a first lower optical surface that face opposite directions; the first peripheral portion has a first upper peripheral surface and a first lower peripheral surface that face opposite directions; the first connecting portion has a first upper connecting surface and a first lower connecting surface that face opposite directions; the first lower optical surface, the first lower peripheral surface, and the first lower connecting surface face toward the second lens;
    the second shading layer is attached to the first upper peripheral surface.

2. The optical lens as claimed in claim 1, wherein the first shading layer and the second shading layer are made of different materials.

3. The optical lens as claimed in claim 1, further comprising a second shading layer made of an opaque material, wherein the first optical valid area has a first upper optical surface and a first lower optical surface that face opposite directions; the first peripheral portion has a first upper peripheral surface and a first lower peripheral surface that face opposite directions;
    the first connecting portion has a first upper connecting surface and a first lower connecting surface that face opposite directions; the first lower optical surface, the first lower peripheral surface, and the first lower connecting surface face toward the second lens; the second shading layer is attached to the first upper connecting surface.

4. The optical lens as claimed in claim 3, wherein the first shading layer and the second shading layer are made of different materials.

5. The optical lens as claimed in claim 3, wherein the opaque material of the first shading layer and the opaque material of the second shading layer are respectively selected from ceramics, metals, metal oxides, polyurethanes, epoxies, alkyds, polyester paints, opaque adhesives, and a combination thereof.

6. The optical lens as claimed in claim 1, wherein the first peripheral portion has a first upper peripheral surface and a first lower peripheral surface that face opposite directions; the second peripheral portion has a second upper peripheral surface and a second lower peripheral surface that face opposite directions; the first lower peripheral surface faces the second upper peripheral surface, and the first lower peripheral surface has a first abutting inclined surface; the second upper peripheral surface has a second abutting inclined surface corresponding to the first abutting inclined surface, and the first abutting inclined surface abuts against the second abutting inclined surface.

7. The optical lens as claimed in claim 1, wherein a peripheral gap is formed between the first peripheral portion and the second peripheral portion.

8. The optical lens as claimed in claim 7, further comprising a third shading layer made of an opaque material and disposed in the peripheral gap.

9. The optical lens as claimed in claim 8, wherein the first shading layer and the third shading layer are made of different materials.

10. The optical lens as claimed in claim 8, wherein the opaque material of the first shading layer, and the opaque material of the third shading layer are respectively selected from ceramics, metals, metal oxides, polyurethanes, epoxies, alkyds, polyester paints, opaque adhesives, and a combination thereof.

11. The optical lens as claimed in claim 1, further comprising a fourth shading layer made of an opaque material, wherein a connection gap is formed between the first connecting portion and the second connecting portion, and the fourth shading layer is disposed in the connection gap.

12. The optical lens as claimed in claim 11, wherein the first shading layer and the fourth shading layer are made of different materials.

13. The optical lens as claimed in claim 11, wherein the opaque material of the first shading layer, and the opaque material of the fourth shading layer are respectively selected from ceramics, metals, metal oxides, polyurethanes, epoxies, alkyds, polyester paints, opaque adhesives, and a combination thereof.

14. The optical lens as claimed in claim 1, wherein the opaque material of the first shading layer is selected from ceramics, metals, metal oxides, polyurethanes, epoxies, alkyds, polyester paints, opaque adhesives, and a combination thereof.

15. The optical lens as claimed in claim 1, wherein the opaque material of the first shading layer and the opaque material of the second shading layer are respectively selected from ceramics, metals, metal oxides, polyurethanes, epoxies, alkyds, polyester paints, opaque adhesives, and a combination thereof.

16. The optical lens as claimed in claim 1, further comprising an image light sensing module that comprises an image sensing member for receiving the image light, wherein the second optical valid area of the second lens faces the image sensing member.

17. The optical lens as claimed in claim 16, wherein the image light sensing module further comprises a substrate; the image sensing member is disposed on the substrate; the second peripheral portion of the second lens is disposed on the substrate; the second optical valid area is located above the image sensing member.

18. The optical lens as claimed in claim 16, wherein the image light sensing module further comprises a substrate and a spacer; the image sensing member is disposed on the substrate; the spacer is disposed on the substrate and is located around the image sensing member; the second peripheral portion of the second lens is disposed on the spacer; the second optical valid area is located above the image sensing member.

19. An optical lens for being passed through by an image light, comprising:
a first lens having a first optical valid area and a first optical invalid area, wherein the first optical invalid area surrounds the first optical valid area and has a first peripheral portion and a first connecting portion; a side of the first connecting portion is connected to the first optical valid area, and another side of the first connecting portion is connected to the first peripheral portion; at least a part of the first peripheral portion is made of an opaque material;
a second lens having a second optical valid area and a second optical invalid area, wherein the second optical invalid area surrounds the second optical valid area and has a second peripheral portion and a second connecting portion; a side of the second connecting portion is connected to the second optical valid area, and another side of the second connecting portion is connected to the second peripheral portion; at least a part of the second peripheral portion is made of an opaque material; the second peripheral portion is disposed on the first peripheral portion, and the second optical valid area faces the first optical valid area, allowing the image light to pass through the first optical valid area and the second optical valid area; and
a second shading layer made of an opaque material; the first optical valid area has a first upper optical surface and a first lower optical surface that face opposite directions; the first peripheral portion has a first upper peripheral surface and a first lower peripheral surface that face opposite directions; the first connecting portion has a first upper connecting surface and a first lower connecting surface that face opposite directions; the first lower optical surface, the first lower peripheral surface, and the first lower connecting surface face toward the second lens;
the second shading layer is attached to the first upper peripheral surface.

20. The optical lens as claimed in claim 19, wherein at least a part of the first peripheral portion is made of opaque plastic materials or is formed by modifying light-transmitting materials through laser modification.

21. The optical lens as claimed in claim 19, wherein at least a part of the second peripheral portion is made of opaque plastic materials or is formed by modifying light-transmitting materials through laser modification.

22. The optical lens as claimed in claim 19, wherein both a side peripheral surface of the first peripheral portion and a side peripheral surface of the second peripheral portion are made of an opaque material; the first peripheral portion correspondingly surrounds the first optical invalid area; the second peripheral portion correspondingly surrounds the second optical invalid area.

23. The optical lens as claimed in claim 19, wherein the first optical valid area has a first upper optical surface and a first lower optical surface that face opposite directions; the first peripheral portion has a first upper peripheral surface and a first lower peripheral surface that face opposite directions; the first connecting portion has a first upper connecting surface and a first lower connecting surface that face opposite directions; the first lower optical surface, the first lower peripheral surface, and the first lower connecting surface faces toward the second lens;
the first upper peripheral surface is made of an opaque material.

24. The optical lens as claimed in claim 19, wherein the first optical valid area has a first upper optical surface and a first lower optical surface that face opposite directions; the first peripheral portion has a first upper peripheral surface and a first lower peripheral surface that face opposite directions; the first connecting portion has a first upper connecting surface and a first lower connecting surface that face opposite directions; the first lower optical surface, the first lower peripheral surface, and the first lower connecting surface face toward the second lens;
the first upper connecting surface is made of an opaque material.

25. The optical lens as claimed in claim 19, further comprising a first shading layer made of an opaque material, attached to a side peripheral surface of the first peripheral portion and/or a side peripheral surface of the second peripheral portion, and correspondingly surrounding the first optical invalid area and/or the second optical invalid area.

26. The optical lens as claimed in claim 19, further comprising a second shading layer made of an opaque material; the first optical valid area has a first upper optical surface and a first lower optical surface that face opposite directions; the first peripheral portion has a first upper peripheral surface and a first lower peripheral surface that face opposite directions; the first connecting portion has a first upper connecting surface and a first lower connecting surface that face opposite directions; the first lower optical surface, the first lower peripheral surface, and the first lower connecting surface face toward the second lens; the second shading layer is attached to the first upper connecting surface.

27. The optical lens as claimed in claim 19, wherein the first peripheral portion has a first upper peripheral surface and a first lower peripheral surface that face opposite directions;

the second peripheral portion has a second upper peripheral surface and a second lower peripheral surface that face opposite directions; the first lower peripheral surface faces the second upper peripheral surface and has a first abutting inclined surface; the second upper peripheral surface has a second abutting inclined surface corresponding to the first abutting inclined surface, and the first abutting inclined surface abuts against the second abutting inclined surface.

28. The optical lens as claimed in claim 19, further comprising a fourth shading layer made of an opaque material, wherein a connection gap is formed between the first connecting portion and the second connecting portion, and the fourth shading layer is disposed in the connection gap.

29. The optical lens as claimed in claim 19, further comprising an image light sensing module that comprises an image sensing member for receiving the image light; the second optical valid area of the second lens faces the image sensing member.

30. The optical lens as claimed in claim 29, wherein the image light sensing module further comprises a substrate; the image sensing member is disposed on the substrate; the second peripheral portion of the second lens is disposed on the substrate; the second optical valid area is located above the image sensing member.

31. The optical lens as claimed in claim 29, wherein the image light sensing module further comprises a substrate and a spacer; the image sensing member is disposed on the substrate; the spacer is disposed on the substrate and is located around the image sensing member; the second peripheral portion of the second lens is disposed on the spacer; the second optical valid area is located above the image sensing member.

32. An optical lens for being passed through by an image light, comprising:
   at least one lens having an optical valid area and an optical invalid area, wherein the optical invalid area surrounds the optical valid area and has a peripheral portion and a connecting portion;
   a side of the connecting portion is connected to the optical valid area, and another side of the connecting portion is connected to the peripheral portion; characterized in that at least a part of the peripheral portion is made of an opaque material, alternatively, a first shading layer made of an opaque material is attached to a side peripheral surface of the peripheral portion, and wherein the optical valid area has an upper optical surface and a lower optical surface that face opposite directions; the first peripheral portion has an upper peripheral surface and a lower peripheral surface that face opposite directions; the connecting portion has an upper connecting surface and a lower connecting surface that face opposite directions; the upper optical surface, the upper peripheral surface, and the upper connecting surface are located on the same side; a second shading layer made of an opaque material is attached to the upper peripheral surface.

* * * * *